(12) United States Patent
Belknap et al.

(10) Patent No.: US 10,428,900 B2
(45) Date of Patent: Oct. 1, 2019

(54) WHEEL BALANCING WEIGHTS, AND METHODS AND DEVICES FOR USING SAME

(71) Applicant: 3M INNOVATIVE PROPERTIES COMPANY, St. Paul, MN (US)

(72) Inventors: Benjamin D. Belknap, Northville, MI (US); Mark R. Gabel, Cottage Grove, MN (US); James S. Biondich, St. Paul, MN (US); John Scott Taylor, Commerce, MI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/122,188

(22) PCT Filed: Mar. 3, 2015

(86) PCT No.: PCT/US2015/018392
§ 371 (c)(1),
(2) Date: Aug. 29, 2016

(87) PCT Pub. No.: WO2015/134426
PCT Pub. Date: Sep. 11, 2015

(65) Prior Publication Data
US 2016/0369868 A1    Dec. 22, 2016

Related U.S. Application Data

(60) Provisional application No. 62/053,553, filed on Sep. 22, 2014, provisional application No. 61/947,256, filed on Mar. 3, 2014.

(51) Int. Cl.
*F16F 15/32*    (2006.01)
*F16F 15/34*    (2006.01)

(52) U.S. Cl.
CPC .......... *F16F 15/324* (2013.01); *F16F 15/345* (2013.01)

(58) Field of Classification Search
CPC ....... F16F 15/324; F16F 15/328; F16F 15/345
See application file for complete search history.

(56) References Cited

U.S. PATENT DOCUMENTS

| 3,688,380 | A | 9/1972 | Hofmann et al. |
| 3,905,648 | A | 9/1975 | Skidmore |

(Continued)

FOREIGN PATENT DOCUMENTS

| DE | 20 2005 008 955 | 10/2005 |
| EP | 1967757 | 9/2008 |

(Continued)

OTHER PUBLICATIONS

Perfect Equipment, O.E Alloy Wheel Weight Application Guide, 2013, 12 pgs.

(Continued)

*Primary Examiner* — Kip T Kotter

(57) ABSTRACT

A ballasting weight (20) having a length, width, thickness, first side, second side, top, and bottom, and a cross-sectional profile comprising a notch forming a groove (28) extending longitudinally along the length of the first side of the ballasting weight (20), wherein the groove (28) is operatively adapted so as to facilitate the automatic dispensing and/or applying of the ballasting weight (20), e.g., on the rim flange of a wheel rim adjacent to its flange lip, and a device for so dispensing and/or applying the ballasting weight.

20 Claims, 14 Drawing Sheets

(56) References Cited

U.S. PATENT DOCUMENTS

| | | | |
|---|---|---|---|
| 4,300,803 A | 11/1981 | Chorosevic | |
| 4,379,596 A | 4/1983 | Green et al. | |
| 6,364,421 B1 | 4/2002 | Pursley | |
| 7,044,561 B2 | 5/2006 | Petchel et al. | |
| 7,055,914 B1 | 6/2006 | Jenkins et al. | |
| 7,931,342 B2 | 4/2011 | Spaulding et al. | |
| 8,336,379 B2 | 12/2012 | Rogalla et al. | |
| 8,561,464 B2 | 10/2013 | Peinelt et al. | |
| 2006/0158018 A1* | 7/2006 | Francischetti et al. | ..................... F16F 15/324 |
| 2009/0160239 A1 | 6/2009 | Taguchi et al. | |
| 2009/0243370 A1 | 10/2009 | Peniche et al. | |
| 2011/0197672 A1 | 8/2011 | Peinelt et al. | |
| 2013/0162005 A1 | 6/2013 | McMahon et al. | |
| 2013/0224449 A1 | 8/2013 | Bode | |
| 2013/0248409 A1 | 9/2013 | Kunz et al. | |
| 2013/0285435 A1 | 10/2013 | McMahon et al. | |
| 2014/0374431 A1* | 12/2014 | Bode et al. | ........... F16F 15/324 |

FOREIGN PATENT DOCUMENTS

| | | | |
|---|---|---|---|
| EP | 2607745 A1 * | 6/2013 | ............ F16F 15/324 |
| EP | 2610523 | 7/2013 | |
| EP | 2642155 | 9/2013 | |
| JP | 05-107144 | 4/1993 | |
| JP | 2002-372103 | 12/2002 | |
| JP | 2007-162861 | 6/2007 | |
| JP | 2007-177960 | 7/2007 | |
| JP | 2012-172735 | 9/2012 | |
| WO | WO 2005/049714 | 6/2005 | |
| WO | WO 2007/092018 | 8/2007 | |
| WO | WO 2013/000957 | 1/2013 | |
| WO | WO 2013/034399 | 3/2013 | |
| WO | WO 2013/127945 | 9/2013 | |
| WO | WO 2013/139558 | 9/2013 | |
| WO | WO 2013/139626 | 9/2013 | |
| WO | WO 2013/139648 | 9/2013 | |
| WO | WO 2013/139751 | 9/2013 | |
| WO | WO 2013/139836 | 9/2013 | |

OTHER PUBLICATIONS

Perfect Equipment, Wheel Protectors Steel Wheel Weights, 2012, 2 pgs.
SAE, Surface Vehicle Recommended Practice, Jan. 2006, 12 pgs.
International Search Report for PCT International Application No. PCT/US2015/018392, dated Jun. 24, 2015. 4pgs.

* cited by examiner

WHEEL BALANCING WEIGHTS, AND METHODS AND DEVICES FOR USING SAME

CROSS REFERENCE TO RELATED APPLICATIONS

This application is a national stage filing under 35 U.S.C. 371 of PCT/US2015/018392, filed Mar. 3, 2015, which claims the benefit of U.S. Provisional Application No. 61/947,256, filed Mar. 3, 2014, and which claims the benefit of U.S. Provisional Application No. 62/053,553, filed Sep. 22, 2014, the disclosures of which are incorporated by reference in their entireties herein.

FIELD OF THE INVENTION

The present invention relates to ballasting weights (e.g., wheel balancing weights), in particular to ballasting weights that can be automatically dispensed and/or applied to the surface of a substrate, as well as to methods of ballasting using such a ballasting weight, and to devices for accomplishing such ballasting.

BACKGROUND

Weights have been used in various ballasting applications such as, for example, for balancing conventional automobile wheels that include a rubber tire mounted on a wheel rim. Such rims have been made of steel or aluminum alloys. Steel wheel rims include a circumferential rim flange and flange lip. Weights for balancing such wheels have included lead weights mechanically clipped onto the flange lip of steel wheel rims. Other wheel balancing weights have included extruded metal filled polymer composite materials cut to a desired length and backed with a pressure sensitive adhesive for bonding the weight to desired locations on the wheel rim. Still other wheel balancing weights have included individual metal pieces, commonly referred to as chicklets, that are bonded in a row to one side of a double-sided pressure sensitive adhesive tape. The number of such individual weights desired for balancing the wheel would typically be separated by cutting the tape in between adjacent weights.

The present invention is an improvement over such conventional ballasting weights

SUMMARY OF THE INVENTION

In one aspect of the present invention, a ballasting weight is provided that has a length, width, thickness, first side, second side, top, and bottom, and a cross-sectional profile comprising a notch forming a groove extending longitudinally along the length of the first side of the ballasting weight, wherein the groove is operatively adapted so as to facilitate the automatic dispensing and applying of the ballasting weight.

In another aspect of the present invention, another ballasting weight is provided that has a length, a width and a thickness. The ballasting weight can be longer than it is wide and wider than it is thick, with a width to thickness ratio (W/T) in the range from at least about 1.0 up to less than about 2.3, such that the ballasting weight is easier to bend widthwise.

In yet another aspect of the present invention, another ballasting weight is provided that has a length, width, thickness, first side, second side, top, bottom, and is longer than it is wide or thick. This ballasting weight comprises at least one or a plurality of stress relief notches spaced apart lengthwise along its length, with either the width being greater than the thickness or the thickness being greater than the width, and each stress relief notch being formed only partially through the ballasting weight such that less force is needed to bend the ballasting weight in the direction of the stress relief notches.

In an additional aspect, a length of ballasting weight material is provided that is separable into a plurality of ballasting weights according to the present invention.

In a further aspect, a wheel is provided that comprises a tire mounted on a wheel rim and a ballasting weight according to the present invention, where the ballasting weight is a wheel balancing weight, and the wheel rim comprises a rim flange having a flange lip with a peripheral edge, with the wheel balancing weight being attached to the rim flange of the wheel rim and adjacent to the flange lip.

In another aspect of the present invention, a method of balancing a wheel is provided, where the wheel comprises a tire mounted on a wheel rim, with the wheel rim comprising a rim flange having a flange lip with a peripheral edge. The method comprises: bonding at least one ballasting weight according to the present invention, in the form of at least one wheel balancing weight, to the rim flange of the wheel rim at a location, adjacent to the flange lip of the rim flange, so as to balance the wheel.

In yet another aspect, a device is provided that comprises structure operatively adapted for retaining a ballasting weight according to the present invention, such that the device can be positioned to a desired location adjacent to a substrate surface, and the device can manipulate the ballasting weight so as to attach the ballasting weight to the substrate surface.

In an additional aspect, a device is provided that comprises structure operatively adapted for retaining a ballasting weight in the form of a wheel balancing weight according to the present invention, such that the device can be positioned to a desired location adjacent to a wheel rim comprising a rim flange having a flange lip with a peripheral edge, and the device can manipulate the wheel balancing weight so as to attach the wheel balancing weight to the rim flange of the wheel rim and adjacent to the flange lip.

In another aspect of the present invention, a method of balancing a wheel is provided, where the wheel comprises a tire mounted on a wheel rim, with the wheel rim comprising a rim flange having a flange lip with a peripheral edge, and the method comprises: providing a device that comprises structure operatively adapted for releasably retaining a ballasting weight according to the present invention, where the ballasting weight is in the form of a wheel balancing weight; disposing the wheel balancing weight so as to be releasably retained by the device; positioning the device to a desired location, adjacent to the rim flange of the wheel rim, that balances the wheel; and attaching the wheel balancing weight to the rim flange of the wheel rim at the desired location, adjacent to the flange lip of the rim flange.

The present invention can exhibit one or more improvements over conventional ballasting weights. Such improvements may include one or more of being more easily dispensed and/or applied automatically to a surface of a substrate (e.g., the surface of a wheel rim), and more likely to remain on the substrate surface even against forces (e.g., centrifugal forces) applied against the weight.

The terms "comprises" and variations thereof do not have a limiting meaning where these terms appear in the description and claims.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a nanoparticle that comprises "a" fluorescent molecule-binding group can be interpreted to mean that the nanoparticle includes "one or more" fluorescent molecule-binding groups.

As used herein, "a," "an," "the," "at least one," and "one or more" are used interchangeably. Thus, for example, a nanoparticle that comprises "a" fluorescent molecule-binding group can be interpreted to mean that the nanoparticle includes "one or more" fluorescent molecule-binding groups.

The term "and/or" means one or all of the listed elements or a combination of any two or more of the listed elements (e.g., preventing and/or treating an affliction means preventing, treating, or both treating and preventing further afflictions).

As used herein, the term "or" is generally employed in its sense including "and/or" unless the content clearly dictates otherwise.

Also herein, the recitations of numerical ranges by endpoints include all numbers subsumed within that range (e.g., 1 to 5 includes 1, 1.5, 2, 2.75, 3, 3.80, 4, 5, etc.).

The above summary of the present invention is not intended to describe each disclosed embodiment or every implementation of the present invention. The description that follows more particularly exemplifies illustrative embodiments.

DETAILED DESCRIPTION OF CERTAIN EMBODIMENTS

Figure 1:
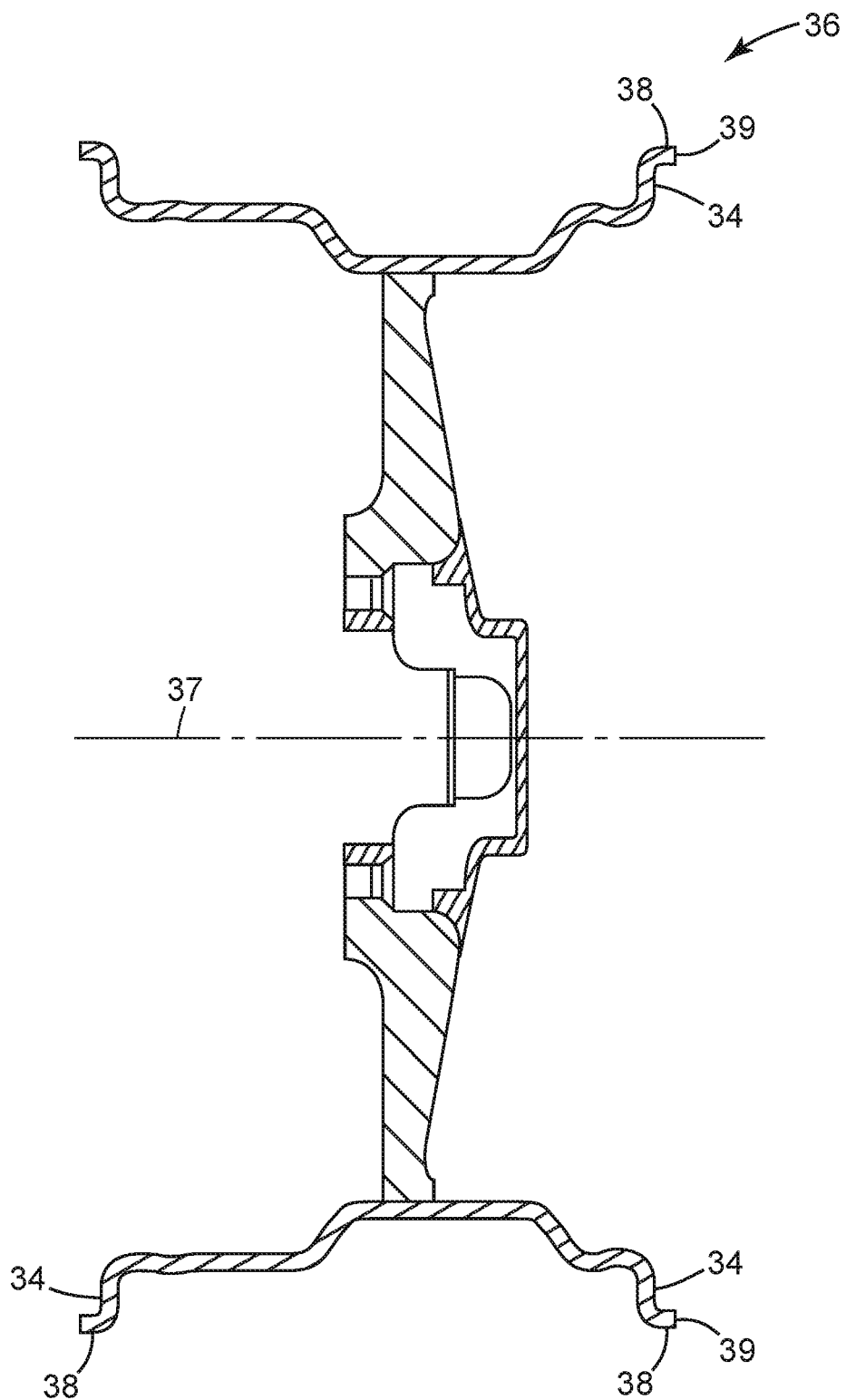
FIG. 1 is a cross sectional view of a vehicle wheel rim suitable for mounting one or more adhesive-backed wheel balancing weights according to the present invention.
Figure 2:
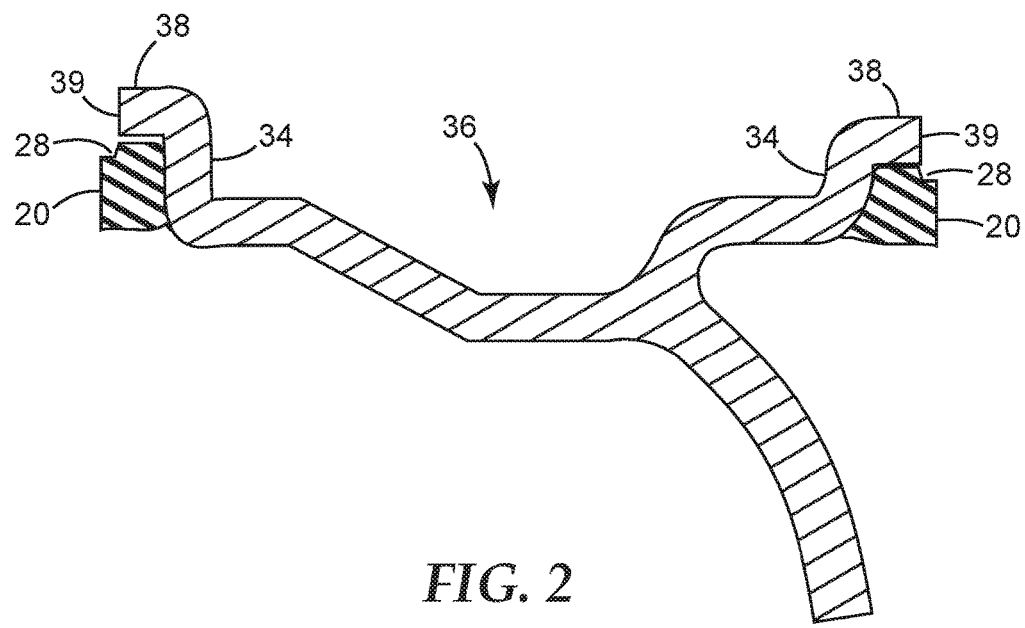
FIG. 2 is a cross sectional view of a portion of a vehicle wheel rim with wheel balancing weights according to the present invention mounted on the inner and outer rim flange thereof.

In describing embodiments of the invention, specific terminology is used for the sake of clarity. The invention, however, is not intended to be limited to the specific terms so selected, and each term so selected includes all technical equivalents that operate similarly. In addition, while the below detailed description of the drawings is related to the use of a ballasting weight for balancing a wheel, it is understood that the teachings provided may be equally applicable to any use of a ballasting weight according to the present invention.

Unless otherwise indicated, all numbers expressing feature sizes, amounts, and physical properties used in the specification and claims that are modified by the term "about" are approximations that may vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range. As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The term "polymer" will be understood to include polymers, copolymers (e.g., polymers formed using two or more different monomers), oligomers and combinations thereof, as well as polymers, oligomers, or copolymers that can be formed in a miscible blend.

Alphabetical suffixes that follow a reference number including "a", "B", "C", "D", "E", "F", "G", "H", "I", "J", "K", "L", "M", "N", "O", and "P" may be used throughout this description to denote different embodiments or modifications of parts/features. It is understood that, unless otherwise noted, the description of an individual part/feature (e.g., part/feature identified with an "a" suffix) also applies to the further illustrated embodiments of the part/feature (e.g., part/feature identified with a "B" or other suffix). Similarly, the description of a part/feature identified with no suffix may apply, unless noted otherwise, to all embodiments of the part/feature.

An example of a ballasting weight according to the present invention is a balancing weight (20) for balancing a wheel, such as that conventionally used on automobiles. Referring to FIGS. 1, 2, 5, 11, 13, and 18D, such a weight (20) can be mounted on a rim flange (34) of a wheel rim (36). The balancing weight (20) has a length providing a desired mass for balancing, a width (25), a thickness (26), a first leading or stop side (21), a second side (22), a top (23), and a bottom (24), with a cross-sectional or end profile comprising a first or leading notch (27) forming a groove (28) extending longitudinally along the length of the first side (21) of the balancing weight (20). Referring to FIGS. 5C, 5D, 5F, and 16, the cross-sectional profile of the balancing weight (20) can also include a second or trailing notch (40) forming another groove (42) extending longitudinally along the length of the second side (22) of the balancing weight (20). Exemplary end profiles of such balancing weights (20) are shown in FIGS. 2, 5, 8, and 16. The balancing weight (20) can be backed by an adhesive such as, for example, layer or tape (32). If the balancing weight (20) is backed with an adhesive (32), a release liner (33) can be used to protect the adhesive surface. The adhesive tape (32) can be a double sided adhesive tape (32) with one side of the adhesive tape (32) being adhered to the bottom curved surface (24) of the balancing weight (20).

It is desirable for the adhesive (32) to have a leading edge spaced back from the first side (21) of the balancing weight (20). It can be desirable for the adhesive (32) to be adhered to the bottom (24) of the wheel balancing weight (20) such that none of the adhesive (32) is located between the first side (21) of the wheel balancing weight (20) and a curved portion (68) of the flange lip (38), for example, like that shown in FIGS. 5A-5G. It can be desirable for the wheel balancing weight (20) to be adhered to the rim flange (34) of the wheel rim (36), with an adhesive (32), such that the first side (21) of the wheel balancing weight (20) is located a distance from the flange lip (38) in the range of from zero up to and including about twice the thickness of the adhesive (32). It can also be desirable for the wheel balancing weight (20) to be adhered to the rim flange (34) of the wheel rim (36) such that there is a gap between the first side (21) of the wheel balancing weight (20) and the flange lip (38), with the adhesive (32) filling in the range of from none up to and including about 25% of the volume of the gap.

Each notch (27 and/or 40) includes opposing legs and is located between the top (23) and bottom (24), of the balancing weight (20). One of these opposing legs can be a bottom leg extending from its corresponding side (21,22), and the other of the opposing legs can be a side leg, extending from the bottom leg towards the top (23). It can be desirable, though not required, for the side leg to be parallel to the second side (22) of the cross-sectional profile. Similarly, each groove (28,42) can include opposing surfaces, with one of the opposing surfaces being a bottom surface (46), the other of the opposing surfaces being a side surface (44), and the opposing surfaces forming an angle (e.g., a right angle) therebetween. The balancing weight (20) can include a flat surface on at least one of the top (23), second side (22), groove bottom surface (46), and groove side surface (44). The bottom surface (46) of the groove (28 and/or 42) can be parallel to a surface on the top (23) of the balancing weight (20), and the side surface (44) of the groove (28 and/or 42) can be parallel to a surface on the second side (22) of the balancing weight (20). It can be desirable for the opposing surfaces (44,46) of each groove (28 and/or 42), as well as the opposing legs of each notch (27 and/or 40) to be separated by an angle in the range of from about 45 degrees up to and including about 135 degrees. It can be desirable for at least one notch (27 and/or 40) to be a "V-Shaped" notch, with the corresponding groove (28,42) opening out from the side (21 and/or 22) of the weight (20).

It is desirable for each groove (28 and/or 42) to be operatively adapted (i.e., dimensioned, designed or otherwise configured) so as to facilitate the automatic dispensing and/or applying of the balancing weight (20). For example, each groove (28 and/or 42) can be operatively adapted for receiving therein a portion of a device (70 or 80), where the device (70 or 80) includes structure operatively adapted for retaining the balancing weight (20) such that the device (70 or 80) can dispose the balancing weight (20) to a desired location and press the balancing weight (20) onto a desired surface. Such devices (70,80) are described in greater detail below.

Figure 13:
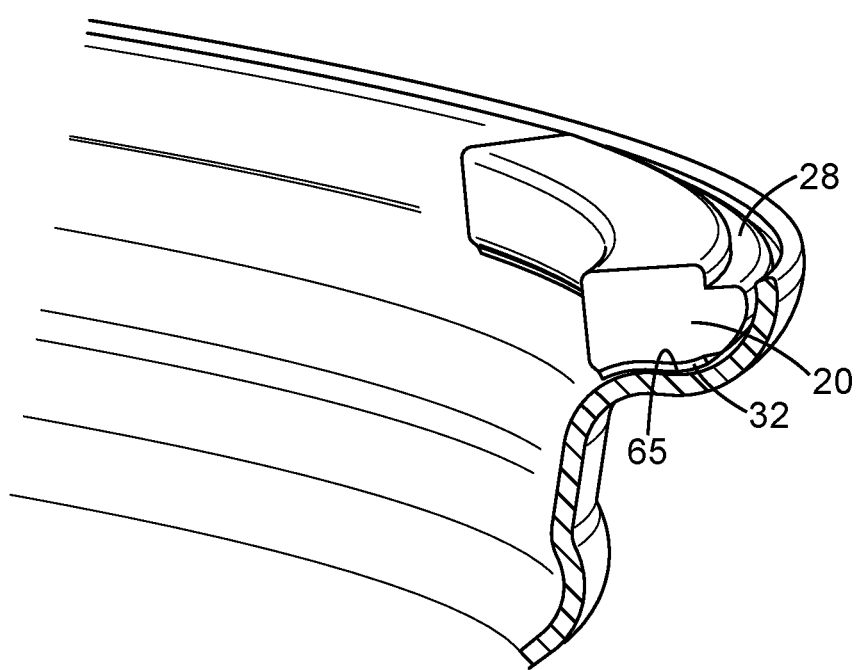
FIG. 13 is a partially cross sectional perspective end view of a wheel balancing weight according to the present invention adhered adjacent to the flange lip of a vehicle wheel rim flange.

Referring to FIGS. 6-11, 17 and 18, it is desirable for the device (70,80) to include structure operatively adapted (i.e., dimensioned, designed or otherwise configured) for retaining the balancing weight (20) such that the device (70,80) can be positioned to a desired location adjacent to a desired surface of the wheel rim (36) or other a substrate surface, such that the device (70,80) can manipulate the balancing weight (20) so as to attach the balancing weight (20) to the surface (e.g., surface (65)). In particular the device (70,80) can be positioned to a desired location adjacent to a wheel rim (36) comprising a rim flange (34) having a flange lip (38) with a peripheral edge (39), and the device (70,80) can manipulate the wheel balancing weight (20) so as to attach the wheel balancing weight (20) to a surface (65) of the rim flange (34) and adjacent to the flange lip (38). Referring to FIG. 13, it can be preferable for the topography of the surface of the weight bottom (24) to be the same as that of the rim flange surface (65) in order to better ensure good bonding between the surface (65) and weight bottom (24) by the adhesive (32).

For example, the device (70) includes a first arcuate jaw (72) and a second arcuate jaw (73) operatively adapted for so retaining a balancing weight (20) therebetween that is bent along its length widthwise with a radius of curvature like that shown in FIGS. 6-12. Referring to FIGS. 9-12, the device (70) can be used to mount the wheel balancing weight (20) on a rim flange (34) of a wheel rim (36) having an axis of rotation (37) and radius of curvature about its axis of rotation (37), by bending the balancing weight (20) widthwise so as to have a widthwise radius of curvature matching the radius of curvature of the wheel rim (36). In contrast, the device (80) includes a first arcuate jaw (81) and a matching second arcuate jaw (not shown) operatively adapted for so retaining a balancing weight (20) therebetween that is bent in its thickness direction with a radius of curvature like that shown in FIGS. 18A-18D. In this way, the device (80) can be used to mount the wheel balancing weight (20) on any wheel rim flange (34), independent of the radius of curvature of the wheel rim (36) (i.e., without having to match the radius of curvature of the wheel rim), by bending the balancing weight (20) in its thickness direction.

As shown in FIGS. 18A-D, the device (80) allows one end of the weight (20) to be initially secured to the wheel rim flange (34), adjacent edge (39), by moving the corresponding end of at least the jaw (81) toward the flange (34) until the adhesive (32) at the one end of the weight (20) adheres to the flange surface (65). The remaining length of the weight (20) is secured to the flange surface (65) by moving the jaw (81) around the arc of the wheel rim (36), following the edge (39), without moving the jaw (81) away from the flange (34). In this way, the remaining length of the weight (20) that is not initially adhered to surface (65) is pulled out of the device (80) and adhered to a corresponding portion of the surface (65).

The jaws of the devices (70) and (80) form a channel (74) and (85), respectively, for receiving a wheel balancing weight (20) therein. The devices (70) and (80) can include a mechanism (not shown) for biasing their jaws toward each other, when the balancing weight (20) is initially inserted into the corresponding channel (74,85). It may be desirable for this mechanism to keep the jaws biased toward each other in order to retain the balancing weight (20) therebetween, before the weight (20) is applied. The jaws may be biased away from each other any time after the balancing weight (20) is positioned within the jaws, including after the balancing weight (20) has been attached to a surface. To at least assist in retaining the weight (20) on the first jaw (72), if the second jaw (73) is withdrawn, the device (70) can include holes (76) formed as blind holes and/or through holes for receiving a magnet, or formed as through holes through which a vacuum can be pulled on the weight (20). Similarly, the device (80) can include holes (86) formed as blind holes and/or through holes for receiving a magnet, or formed as through holes through which a vacuum can be pulled on the weight (20), so as to at least assist in retaining the weight (20) on the first jaw (81).

The first arcuate jaw (72) of the device (70) is operatively adapted for receiving therein at least a portion of the second side (22) and the top (23) of the balancing weight (20), and the second arcuate jaw (73) is operatively adapted for receiving therein at least a portion of the first side (21) of the balancing weight (20). In addition to receiving therein at least a portion of the second side (22) and the top (23), the first arcuate jaw (72) can also receive at least a portion of at least one groove (28 and/or 42) of the wheel balancing weight (20). The jaws of the device (80) are similarly adapted.

Referring to FIGS. 8-11, the side surface (44) of at least one groove (28 and/or 42) can be a retaining surface against which the device (70) applies a gripping force to retain the balancing weight (20) within the device (70), until the weight (20) is in position or otherwise ready to be adhered to a surface of the wheel rim (36). This gripping force can be applied between the side surface (44) of at least one groove (28 and/or 42) and an opposite side (22 and/or 21) of the balancing weight (20). For example, the gripping force could be applied between at least the side surface (44) or both surfaces (44,46) of the groove (28) and the opposite side (22) of weight (20). In addition or alternatively, the gripping force could be applied between at least the side surface (44) or both surfaces (44,46) of the groove (42) and the opposite side (21) of weight (20). The gripping force can applied between at least the side surface (44) of the one groove (28) and at least the side surface (44) of the other groove (42). The bottom surface (46) of each groove (28 and/or 42) can also function as a pressurizing surface against which the device (70) can transmit a force to press the balancing weight (20) against a surface such as, e.g., a rim flange surface (65).

The automatic dispensing and/or applying of the balancing weight (20) can be facilitated when the groove (28) allows the weight (20) to be adhered to the rim flange (34), or other portions of the wheel rim (36), without the device (70 or 80) interfering with (e.g., making premature contact with) the rim flange (34), or other portion of the wheel rim (36), and thereby preventing or otherwise impeding the weight (20) from being adhesively bonded to the desired surface of the wheel rim (36). For example, referring to FIG. 11, the groove (28) is configured so that a portion of the device (70) (e.g., device jaw (72)) does not contact the peripheral edge (39) of the wheel rim flange (34), when the adhesive (32) is adhered to the rim flange surface (65). The jaw (81) of device (80) is similarly structured.

Figure 12:
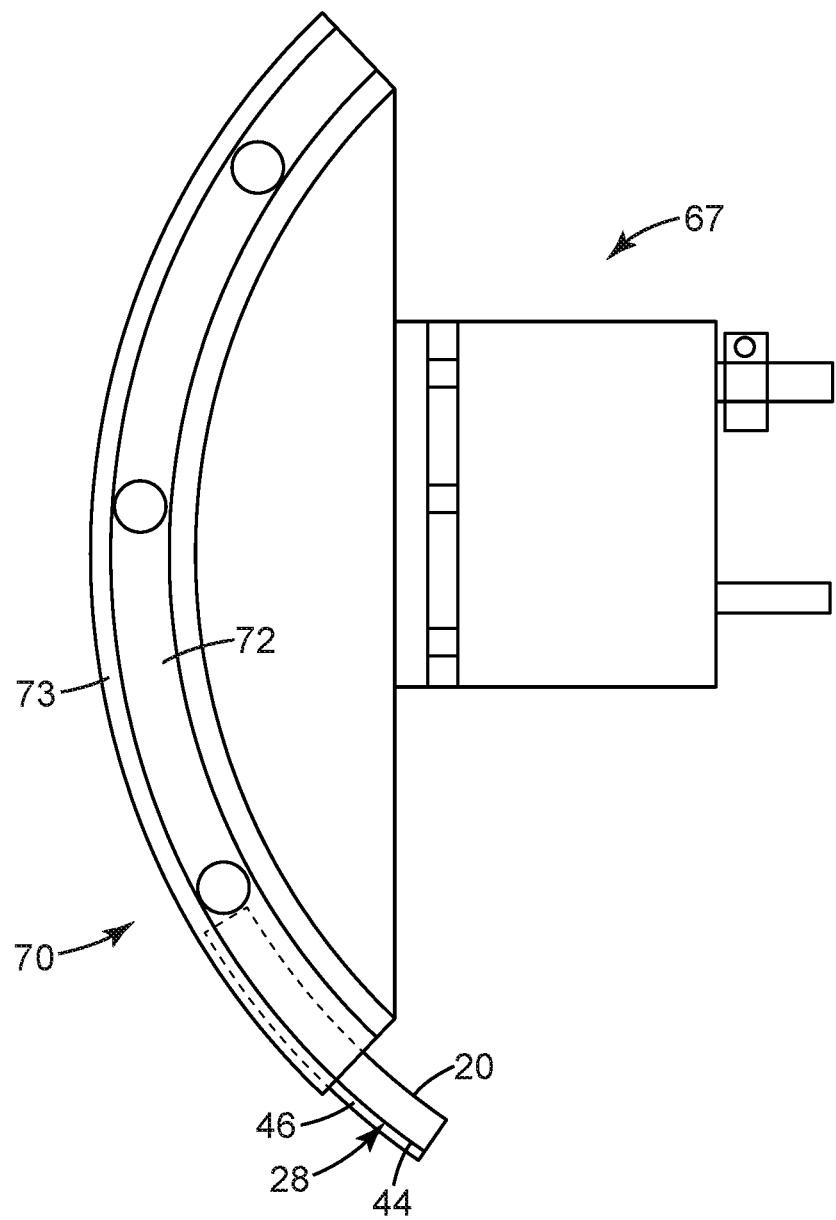
FIG. 12 is a top plan view of an end effector according to the present invention that can be attached to a robotic arm, with the end effector comprising a device for retaining, disposing and/or attaching a ballasting weight to a desired location on the surface of a substrate (e.g., the rim flange of a vehicle wheel rim), with a ballasting weight partially inserted therein.
Figure 17A:
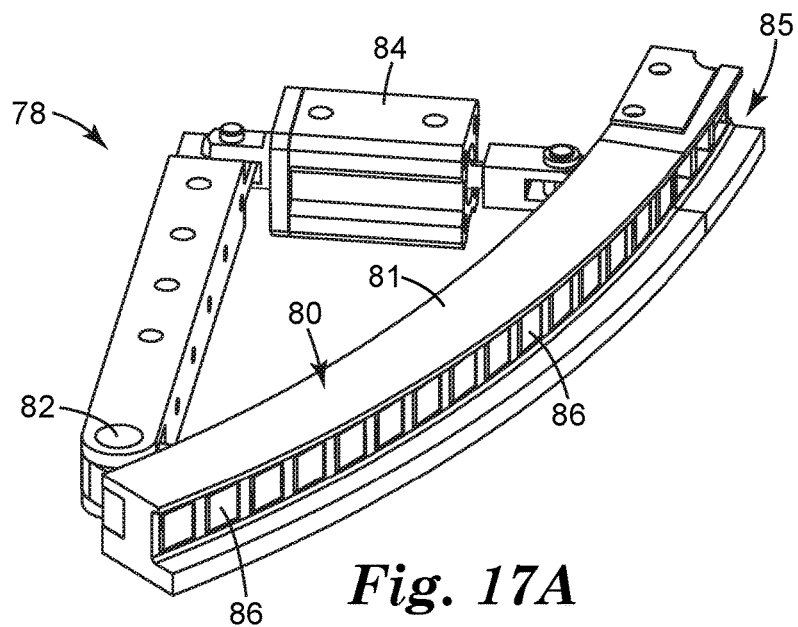
FIG. 17A is a perspective side view of an end effector according to the present invention that can be attached to a robotic arm, with the end effector comprising an alternative device for retaining, disposing and/or attaching a ballasting weight to a desired location on the surface of a substrate (e.g., the rim flange of a vehicle wheel rim)
Figure 17B:
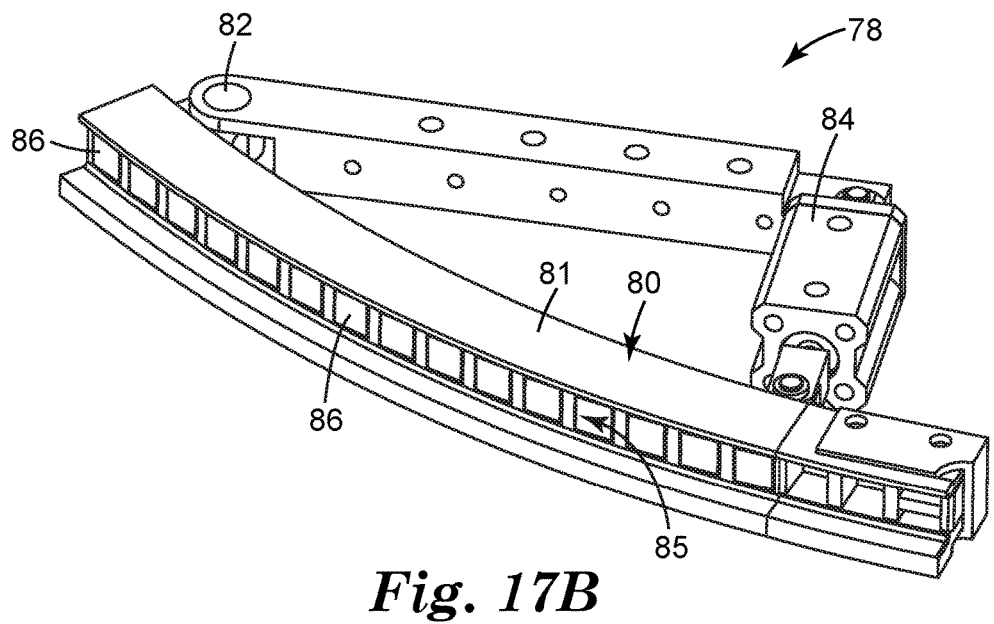
FIG. 17B is a perspective bottom view of the end effector of FIG. 17A.
Figure 18A:
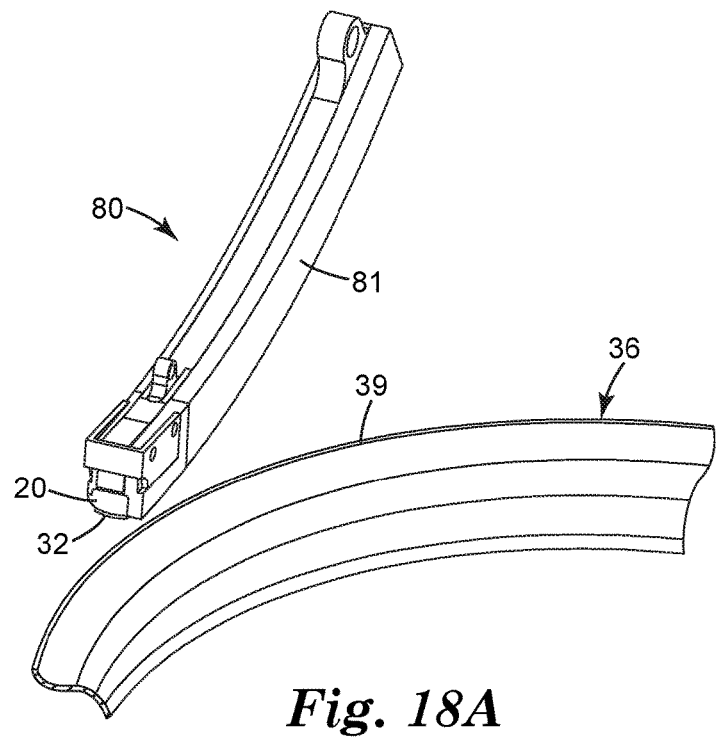
FIG. 18A is a perspective end view of a portion of the end effector of FIG. 17A with the alternative device in position to initiate the attaching of a ballasting weight to a desired location on the rim flange of a vehicle wheel rim.
Figure 18B:
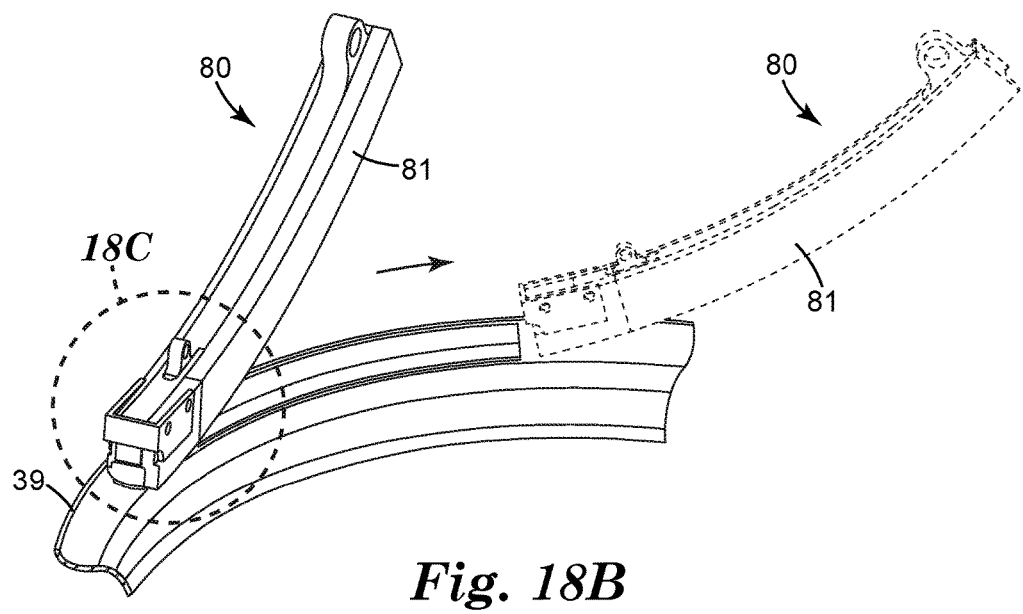
FIG. 18B is a perspective end view of the end effector portion of FIG. 18A transitioning from the point one end of the ballasting weight is initially attached to the vehicle wheel rim flange to a perspective side view (in Phantom) of the FIG. 18A end effector portion in position after the entire ballasting weight is attached to the vehicle wheel rim flange.
Figure 18C:
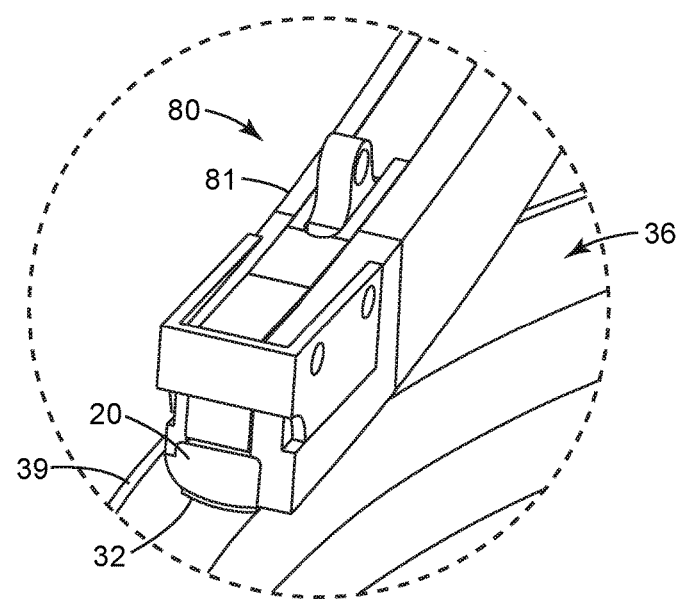
FIG. 18C is an enlarged view of the circled area 18C from FIG. 18B.
Figure 18D:
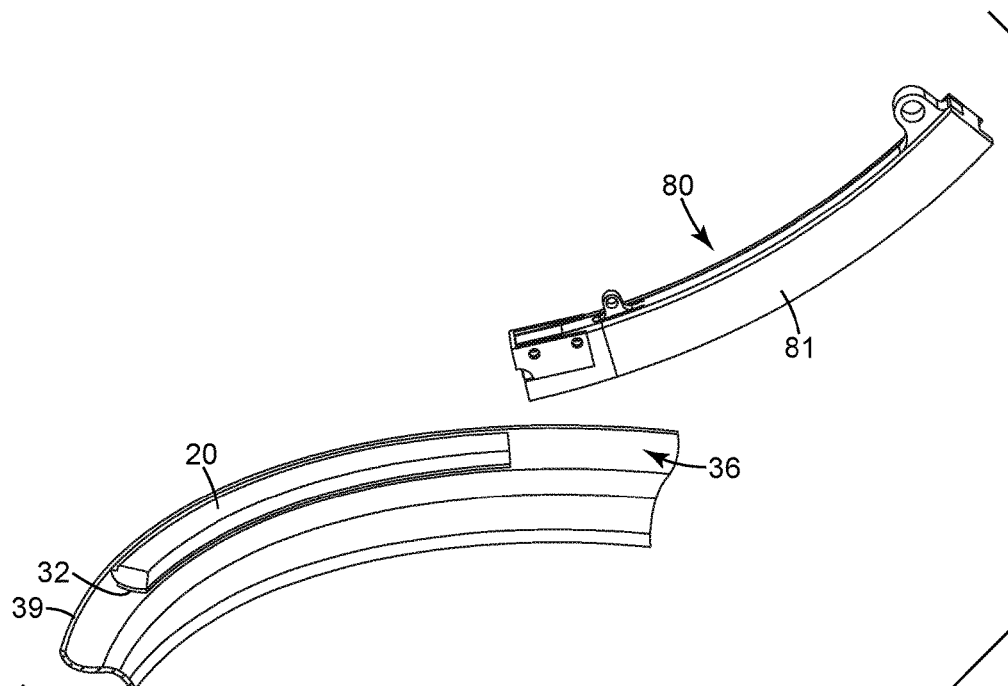
FIG. 18D is a perspective side view of the end effector portion of FIG. 18A in a position away from the vehicle wheel rim flange, after having attached the ballasting weight.

As shown in FIGS. 12 and 17, the devices (70) and (80) can form the leading part of an end effector (67) or (78) that can be attached to a robotic arm (not shown). Each end effector (67,78) can then be used to manually or automatically retain, dispose and/or attach the ballasting weight (20) to a desired location on the surface of the rim flange (34) of a vehicle wheel rim (36) or another substrate surface. The end effector (67) shown in FIG. 12 holds the device (7), and therefore the weight (20), in a fixed orientation which is changeable by moving the robotic arm (not shown) on which it is attached. The other end effector shown in FIG. 17, in contrast, allows the device (80), and therefore the weight (20), to pivot about a point (82) at one end of the jaw (81), when the other end of the jaw (81) (i.e., weight (20) is moved by an actuator mechanism (84) such as, for example, a pneumatic or electric piston. The liner (33) can be removed from the adhesive (32) before, during or after the weight (20) is fed into the channel (74,85) of the device (70,80) being used.

The balancing weight (20) can be longer than it is wide and wider than it is thick, with a width (25) to thickness (26) ratio (W/T) in the range from at least about 1.0, and in increments of 0.1, up to less than about 2.3, such that the balancing weight (20) can be readily bent along its length widthwise. Such a weight configuration can be particularly desirable, when used with the device (70). The use of the device (80) can allow for the use of even higher W/T ratios. The balancing weight (20) can be longer than it is wide and wider than it is thick. It can be desirable for the thickness (26) of the wheel balancing weight (20) to be less than or equal to about 47.625 mm. The bottom (24) of the weight (20) can have a surface that curves between the first side (21) and the second side (22) so as to match, or otherwise be securely bonded to, a corresponding surface of a wheel rim (36) such as surface (65).

Figure 15A:
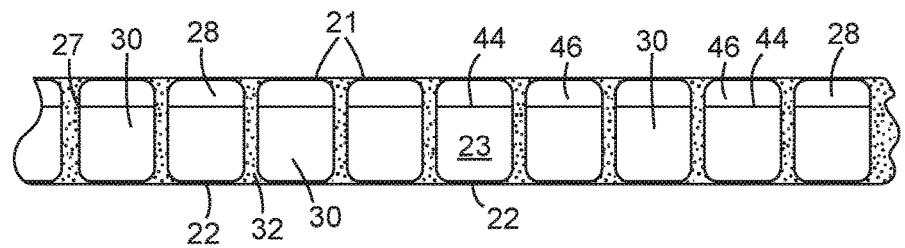
FIG. 15A is a top view of a length of ballasting weight material, according to an alternative embodiment of the present invention, comprising a plurality of individual weights connected together with an adhesive tape, with each individual weight being a metal (elemental or alloy), a metal particle filled polymer composite material or other composite material, but with the same type or similar end profile or cross section as the continuous ballasting weight material embodiments according to the present invention (e.g., like that shown in FIG. 6)
Figure 15B:
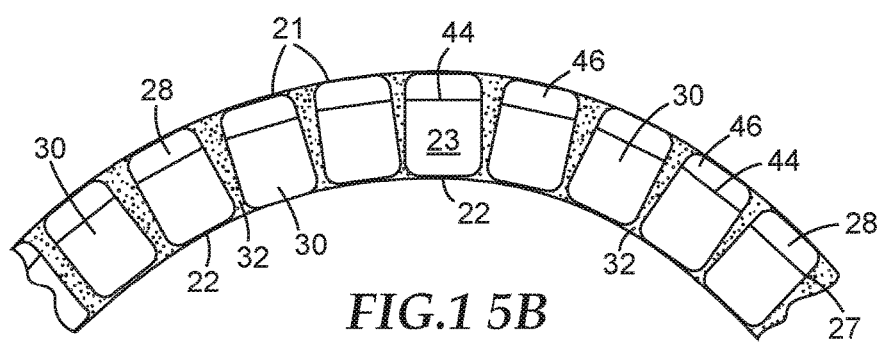
FIG. 15B is a top view of the ballasting weight material of FIG. 15A bent along its length widthwise to accommodate the curvature of, e.g., a vehicle wheel rim.
Figure 16A:
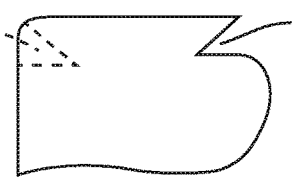
FIGS. 16A through 16D are each an alternative ballasting weight end profile, according to the present invention.
Figure 16C:
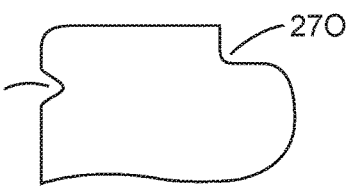
Figure 16B:
Figure 16D:
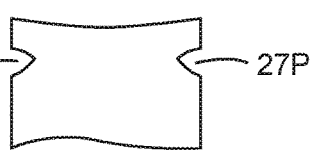

The balancing weight (20) can include one or multiple individual weights (20) and/or the weights (30) like those shown in FIGS. 15A and 15B. In the wheel balancing industry, individual weights (30) are often referred to as chicklets. Each wheel balancing weight (20,30) can have a linear density that is greater than, equal to or less than that of a conventional clip-on lead wheel balancing weight. If each wheel balancing weight (20) includes multiple individual weights (20 and/or 30), it can be desirable for the adhesive (32) to be a tape, with the individual weights (20 and/or 30) are backed and connected together by the adhesive tape (32). It can be desirable for a length of balancing weight material to be separable into a plurality of balancing weights (20) or (30). Such a length of balancing material can be wound into a spool of material such as, for example, into a level wound spool. Each balancing weight (20) can include one or multiple individual weights (20) and/or (30).

Figure 14A:
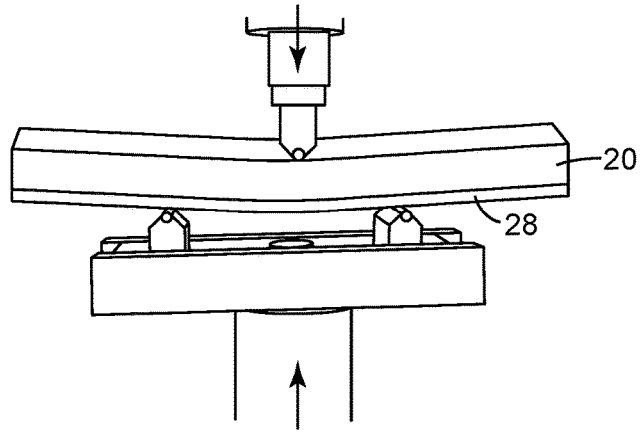
FIG. 14A is a perspective front view of a ballasting weight, according to the present invention, bent along its length in the widthwise direction per a 3-point bend test, without any stress relief notches.
Figure 14B:
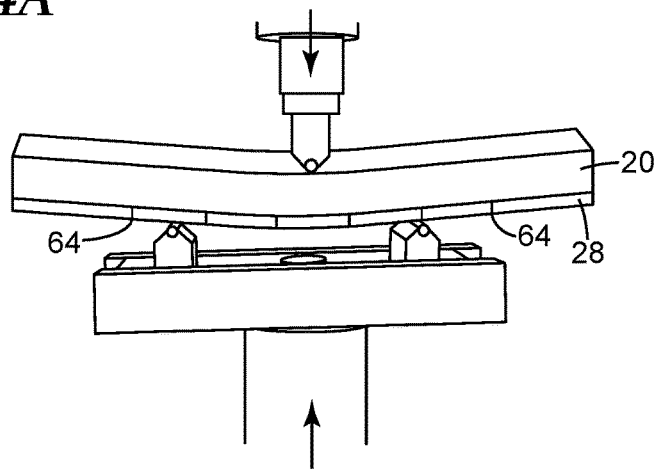
FIG. 14B is a perspective front view of a ballasting weight bent in the widthwise direction per the 3-point bend test, with stress relief notches.
Figure 14C:
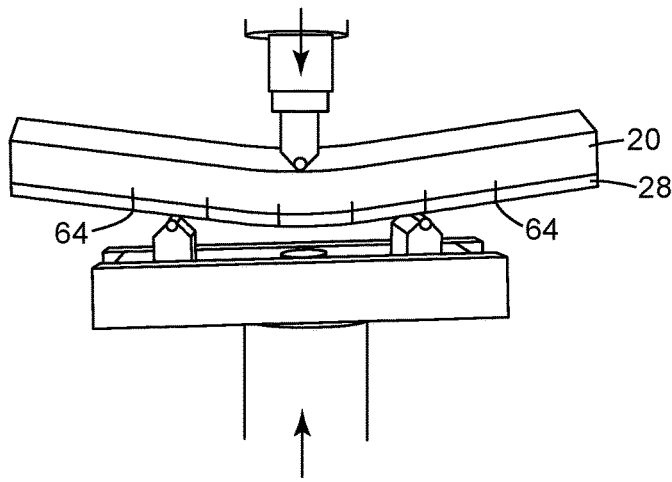
FIG. 14C is a perspective front view of a ballasting weight bent along its length in the widthwise direction per the 3-point bend test, with deeper stress relief notches than those of FIG. 14B.

Referring to FIGS. 14A-14C, the balancing weight (20) can include at least one or a plurality of stress relief notches or cuts (64) spaced apart lengthwise along its length, with either the width (25) being greater than the thickness (26) or the thickness (26) being greater than the width (25). Each stress relief notch (64) is formed only partially through the balancing weight (20) such that less force is needed to bend the balancing weight (20) in the direction of the stress relief notches (64). If the balancing weight (20) is wider than it is thick, it can be desirable for each stress relief notch (64) to be formed from the first side (21) toward the second side (22), through the thickness (26) and partially through the width (25), such that less force is needed to bend the balancing weight (20) widthwise in the direction of the stress relief notches (64). If an adhesive layer or tape (32) is attached to the bottom (24) of the balancing weight (20), each stress relief notch (64) can be formed so as to not cut into the adhesive (32).

Figure 3:
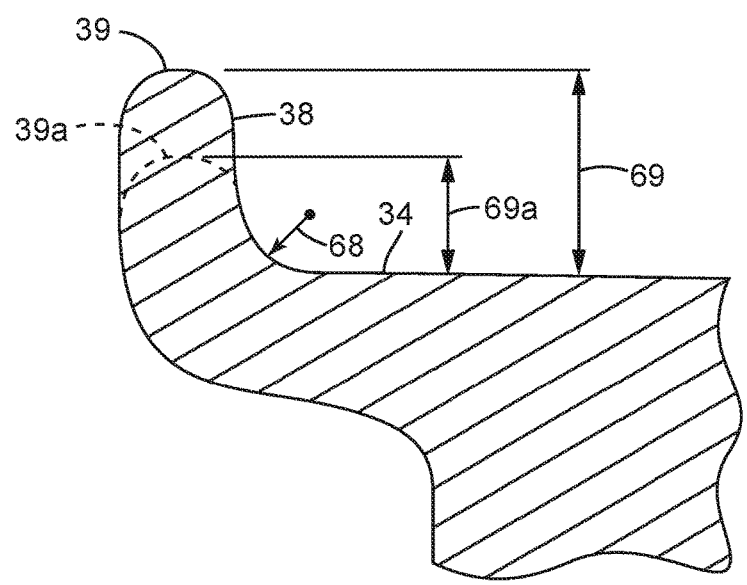
FIG. 3 is a cross sectional view of the rim flange of a vehicle wheel rim showing two possible flange lip depths 69 and 69a, with rim flange lip 39 having a depth 69 typically used for receiving thereon conventional clip-on wheel weights and rim flange lip 39a (shown in phantom) having a depth (about 3/16" or less) typically added for decoration purposes and not suitable for receiving thereon conventional clip-on wheels application.
Figure 4A:
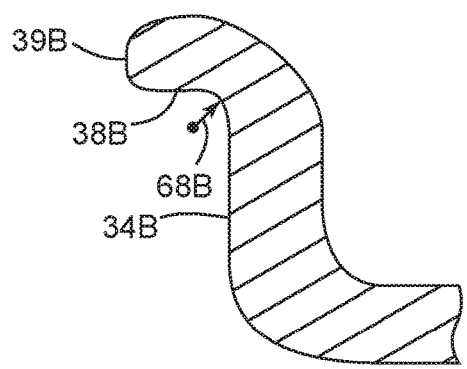
FIGS. 4A through 4D are cross sectional views of different rim flanges.
Figure 4B:
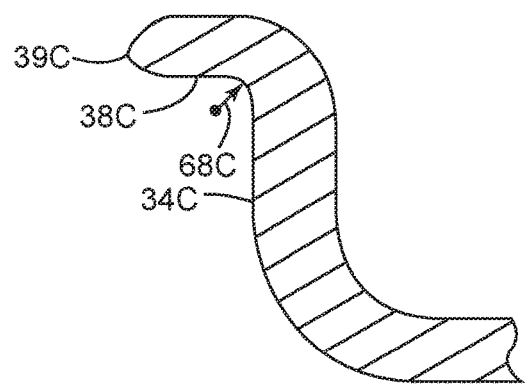
Figure 4C:
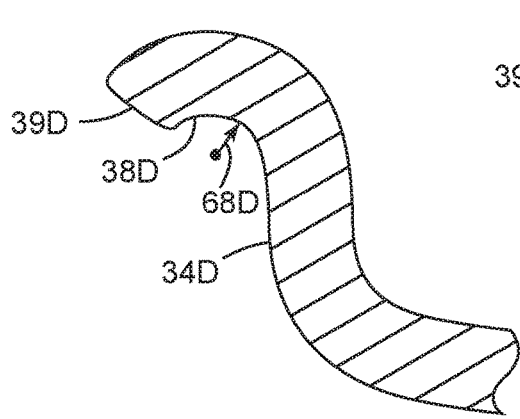
Figure 4D:
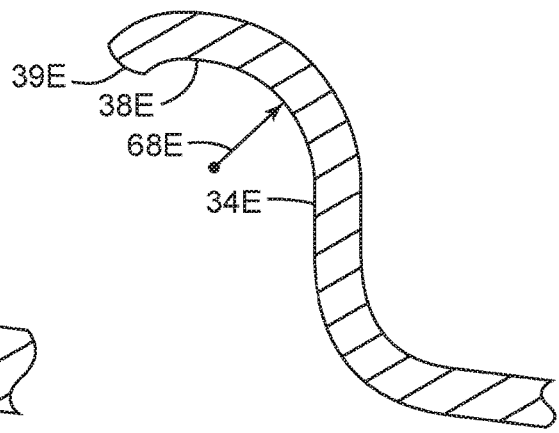

The side (21) of the balancing weight (20) can include a stop surface that is operatively adapted to be stopped by the flange lip (38) of the rim flange (34), when centrifugal forces caused by the rotation of the wheel rim (36) are applied to the attached wheel balancing weight (20). It is desirable for the balancing weight (20) to not be so thick as to cause the wheel balancing weight (20) to extend enough above the peripheral edge (39) of the flange lip (38) so as to be knocked off of the wheel rim flange (34). For example, the wheel balancing weight (20) can be thin enough to not extend above the peripheral edge (39) of the flange lip (38), when adhered to the wheel rim flange (34). Referring to FIG. 3, the peripheral edge (39) of the flange lip (38) can have a depth (69) that extends enough above the surface of the rim flange (34), on which the weight (20) is adhered, to be suitable for receiving a conventional clip-on wheel balancing weight. There can also be a peripheral edge (39*a*), shown in phantom, having a depth (69) that is not suitable for receiving a conventional clip-on wheel weight but is still sufficiently deep so that the lip (38) can stop the weight (20) from detaching as a result of such centrifugal forces. The stop surface on the leading side (21) of the wheel balancing weight (20) can have a first radius of curvature (66) in the thickness (26) direction that is operatively adapted (i.e., dimensioned, designed or otherwise configured) to conform to a second radius of curvature (68) of the flange lip (38) of the rim flange (34), when the wheel balancing weight (20) is bent (a) in the width direction (as shown in FIGS. 9-12) or (b) in the thickness direction (as shown in FIGS. 18A-18D), and disposed within the second radius of curvature (68) of the flange lip (38). As shown in FIGS. 5A-5G, the first radius of curvature (66) of the wheel balancing weight (20) can be the same as the second radius of curvature (68) of the flange lip (38).

Test Methods

3 Point Bend Testing

To reduce the rigidity of the ballasting weight and make it easier to bend so as to conform to a curved surface on which it is to be bonded or otherwise attached, stress relief notches or cuts can be formed in the ballasting weight, in the direction of the bend (e.g., in the width direction), in order to reduce the modulus of the ballasting weight material. Referring to FIGS. 14A, 14B and 14C, the effectiveness of using such stress relief structures was tested by subjecting three exemplary wheel balancing weight samples to a three-point bend test. All three samples were identical, except that one sample had no relief cuts (see FIG. 14A), a second sample had six equally spaced apart relief cuts of 4 mm in depth (see FIG. 14B), and a third sample was the same as the second sample except that the cuts were 9 mm deep (see FIG. 14C). The first sample (no cuts) required a force of 29.0 N in order to adequately bend the wheel balancing weight. The second sample (4 mm deep cuts) required a force of 17.9 N in order to adequately bend the wheel balancing weight. The third sample (9 mm deep cuts) required a force of only 9.8 N to adequately bend the wheel balancing weight. The 4 mm relief cuts reduced the bending load adequately and did not cut into the adhesive tape on the underside of the wheel balancing weight. Relief cuts can be placed at desired increments (e.g., ¼ oz. or 5 gram increments) to provide a visual weight determination.

Spin Testing

Figure 11:
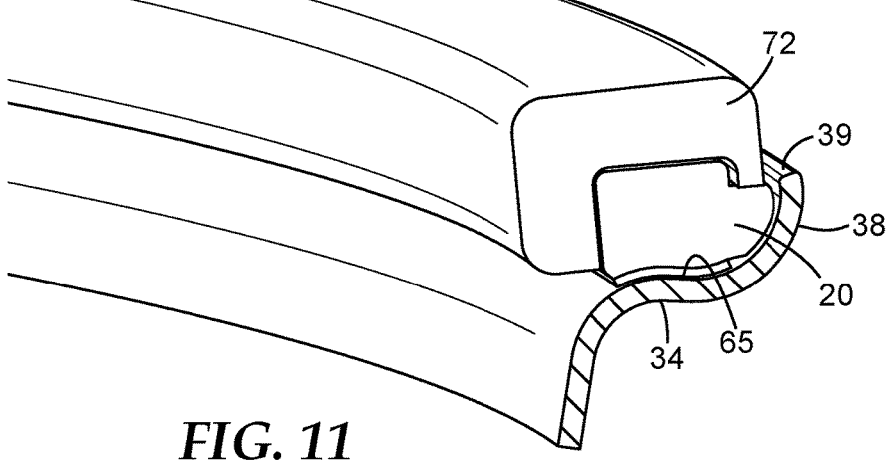
FIG. 11 is a perspective end view of the device jaw and ballasting weight of FIG. 9, with the ballasting weight adhered to the rim flange adjacent the flange lip.

Spin Testing was performed using 15 gram wheel balancing weight samples having a cross-sectional profile like that shown in FIG. 11 that were bonded with acrylic foam adhesive tape onto a test fixture using the rim flange of a steel rim from a conventional automobile wheel. The resulting fixtured wheel balancing weights were spun at 1700 rpm (140 mph) in a temperature (100° F.) and humidity (95% RH) controlled chamber for 8660 minutes (6 days), which equates to over 20,000 miles of traveling for a 14 inch wheel rim. None of the samples separated and flew off of the wheel rim fixture.

Various Embodiments

Ballasting Weight Embodiments
1. A ballasting (e.g., wheel balancing) weight having a length, a width, a thickness, a first leading (e.g., it is the side that leads in the direction of movement caused by an applied force such as, e.g., the centrifugal force applied to a wheel balancing weight with the wheel rotates) or stop side (e.g., it is the side with a surface that makes contact with the rim flange of the rotating wheel so as to stop the movement of the wheel balancing weight), an opposing second side, a top, and a bottom, an exterior surface, and a cross-sectional profile comprising at least one notch forming a groove extending longitudinally along the length of the first side of the ballasting weight, wherein the groove is operatively adapted (i.e., dimensioned, designed or otherwise configured) so as to facilitate the automatic dispensing and applying of the ballasting weight, and the ballasting weight can comprise one or multiple individual weights. The geometry of each groove is structured to allow a tooling or other device to grip, place and pressurize the ballasting weight (e.g., an adhesive backed wheel balancing weight) onto a desired location surface (e.g., onto the rim flange of a wheel rim, adjacent to a flange lip of the rim flange) of a substrate (e.g., a wheel rim).
2. The ballasting weight according to embodiment 1, wherein the cross-sectional profile of the ballasting weight comprises another notch forming another groove extending longitudinally along the length of the second side of the ballasting weight, and the other groove is operatively adapted (i.e., dimensioned, designed or otherwise configured) so as to facilitate the automatic dispensing and applying of the ballasting weight.
3. The ballasting weight according to embodiment 1 or 2, wherein each groove comprises opposing surfaces, with one of the opposing surfaces being a bottom surface (e.g., a generally horizontal surface, as exemplified in FIG. 11), the other of the opposing surfaces being a side surface (e.g., a generally vertical surface, as exemplified in FIG. 11), and the opposing surfaces forming a right angle therebetween. As used herein, the term right angle refers to an angle that is either exactly 90 degrees, slightly smaller than 90 degrees, or slightly larger than 90 degrees (e.g., any angle in the range of 90 degrees plus or minus up to 15 degrees).
4. The ballasting weight according to any one of embodiments 1 to 3, wherein the bottom surface of the groove is parallel to a surface on the top of the ballasting weight and the side surface of the groove is parallel to a surface on the second side of the ballasting weight. As used herein, two surfaces are considered parallel when they are exactly parallel or to within 15 degrees of being exactly parallel.
5. The ballasting weight according to any one of embodiments 1 to 4, wherein the cross-sectional profile comprises a top, a first side and a second side, and at least one notch comprises opposing legs, with one of the opposing legs being a bottom leg (e.g., a generally horizontal leg, as exemplified in FIG. 11), and the other of the opposing legs being a side leg (e.g., a generally vertical leg, as exemplified in FIG. 11) extending from the bottom leg towards the top. It can be desirable, though not required, for the side leg to be parallel to the second side of the cross-sectional profile, and for the opposing legs to form a right angle between them. As used herein, the term right angle refers to an angle that is either exactly 90 degrees, slightly smaller than 90 degrees, or slightly larger than 90 degrees (e.g., any angle in the range of 90 degrees plus or minus up to 15 degrees). As used herein, two legs or sections of the cross-sectional profile are considered parallel when they are exactly parallel or to within 15 degrees of being exactly parallel.
6. The ballasting weight according to any one of embodiments 3 to 5, wherein the side surface of at least one groove is a retaining surface against which a tool or other device applies a gripping force to retain the ballasting weight within the device, and the bottom surface of each groove is a pressurizing surface against which the tool or other device can transmit a force to press the ballasting weight against a surface such as, for example, to activate a pressure sensitive adhesive on the bottom of the ballasting weight.
7. The ballasting weight according to embodiment 6, wherein the gripping force would be applied between the side surface of at least one groove and the second side of the ballasting weight.
8. The ballasting weight according to embodiment 7, wherein the at least one grove comprises the one groove and the other groove of the ballasting weight, wherein the gripping force would be applied between the side surface of the one groove and the side surface of the other groove.
9. The ballasting weight according to any one of embodiments 3 to 8, further comprising a flat surface on at least one, two, three or each of the top, second side, groove bottom surface, and groove side surface. Having a ballasting weight (e.g., a wheel balancing weight) with a flat surface on at least one, two, three or all four of the top, second side, groove bottom surface, and groove side surface has been found to simplify the tooling (e.g., device (70) and (80)) needed to retain or hold the weight until it is automatically or manually positioned to a desired location adjacent to the surface on which it is to be attached. With such flat surface(s), especially on the top and second side, it can be easier to use a vacuum, magnetism and/or a mechanical structure to implement such a weight retaining/holding feature. The use of one, two or all three of these flat surfaces can further allow for the use of the same tooling (e.g., device (70) and (80)) to apply a normal or perpendicular force to wet out and bond an adhesive (e.g., a pressure sensitive adhesive layer or tape) on the bottom of the ballasting weight to a desired surface (e.g., a surface of a rim flange of a wheel rim). A wheel balancing weight according to the present invention has been demonstrated to be conformable to the rim flange of a small diameter wheel rim (14" radius), even during a cold temperature installation (20° F.). Such ballasting weights have also been demonstrated to be able to be wound into level wound rolls, which enables for an automated process and minimizes customer change outs.
10. The ballasting weight according to any one of embodiments 3 to 9, further comprising a flat surface on at least two of the top, second side, groove bottom surface, and groove side surface.

11. The ballasting weight according to any one of embodiments 3 to 10, further comprising a flat surface on at least three of the top, second side, groove bottom surface, and groove side surface.
12. The ballasting weight according to any one of embodiments 3 to 11, further comprising a flat surface on each of the top, second side, groove bottom surface, and groove side surface.
13. The ballasting weight according to any one of embodiments 1 to 12, wherein each groove is located adjacent the top on its side of the ballasting weight, each groove comprises opposing surfaces, and the opposing surfaces of each groove are separated by an angle in the range of from about 45 degrees, and in increments of 1 degree, up to and including about 135 degrees, and any range therebetween (e.g., from about 60 degrees to 100 degrees, etc.).
14. The ballasting weight according to any one of embodiments 1 to 13, wherein at least one notch is a "V-Shaped" notch, and the corresponding groove opens out from the side, and is located between the top and bottom, of the ballasting weight.
15. The ballasting weight according to any one of embodiments 1 to 14, wherein each groove is operatively adapted (i.e., dimensioned, configured and/or designed) for receiving therein a portion of a device (e.g., device (70) and (80)), where the device comprises structure that is operatively adapted (i.e., dimensioned, configured and/or designed) for retaining the ballasting weight (e.g., an adhesive backed wheel balancing weight) such that the device can automatically or manually dispose the ballasting weight to a desired location (e.g., adjacent the rim flange of a wheel rim) and press or otherwise pressurize the ballasting weight (e.g., an adhesive backed wheel balancing weight) onto a desired surface (e.g., the surface of the rim flange adjacent to its flange lip).
16. The ballasting weight according to any one of embodiments 1 to 15, wherein the ballasting weight is longer than it is wide and wider than it is thick, with a width to thickness ratio (W/T) in the range from at least about 1.0, and in increments of 0.1, up to less than about 2.3, such that the ballasting weight can be readily bent along its length widthwise. Such a width to thickness ratio profile is naturally flexible in the width direction, thus making it easier for the weight to conform to a curved surface (e.g., the rim flange of a wheel rim).
17. The ballasting weight according to any one of embodiments 1 to 16, wherein the ballasting weight is longer than it is wide and wider than it is thick, with the bottom having a surface that curves between the first side and the second side and is operatively adapted (i.e., dimensioned, designed or otherwise configured) for being bonded to a substrate surface.
18. The ballasting weight according to any one of embodiments 1 to 17, wherein the ballasting weight can comprise one or multiple individual weights.
19. The ballasting weight according to any one of embodiments 1 to 18, wherein the ballasting weight has a length, width, thickness, first side, second side, top and bottom, being longer than it is wide or thick, and comprising at least one or a plurality of stress relief notches or cuts spaced apart lengthwise along the length, with either the width being greater than the thickness or the thickness being greater than the width, and each stress relief notch being formed only partially through the ballasting weight such that less force is needed to bend the ballasting weight in the direction of the stress relief notches.
20. A ballasting (e.g., wheel balancing) weight having a length, a width and a thickness, the ballasting weight being longer than it is wide and wider than it is thick, with a width to thickness ratio (W/T) in the range from at least about 1.0, and in increments of 0.1, up to less than about 2.3, such that the ballasting weight is easier to bend widthwise, wherein the ballasting weight can comprise one or multiple individual weights.
21. The ballasting weight according to embodiment 20, wherein the ballasting weight is bent widthwise with a curvature having a radius, e.g., matching the radius of curvature of a wheel rim.
22. The ballasting weight according to embodiment 21, wherein the ballasting weight is a wheel balancing weight for being mounted on a rim flange of a wheel rim having an axis of rotation and radius of curvature about its axis of rotation, and the widthwise radius of curvature of the ballasting weight matches, e.g., the radius of curvature of the wheel rim.
23. The ballasting weight according to any one of embodiments 20 to 22, wherein the ballasting weight can comprise one or multiple individual weights.
24. A ballasting (e.g., wheel balancing) weight having a length, width, thickness, first side, second side, top and bottom, being longer than it is wide or thick, and comprising at least one or a plurality of stress relief notches or cuts spaced apart lengthwise along the length, with either the width being greater than the thickness or the thickness being greater than the width, and each stress relief notch being formed only partially through the ballasting weight such that less force is needed to bend the ballasting weight in the direction of the stress relief notches.
25. The ballasting weight according to embodiment 24, wherein the ballasting weight is wider than it is thick, and each stress relief notch is formed from the first side toward the second side, completely through the thickness and only partially through the width, such that less force is needed to bend the ballasting weight widthwise in the direction of the stress relief notches.
26. The ballasting weight according to embodiment 24 or 25, wherein an adhesive or adhesive tape is attached to the bottom of the ballasting weight, and each stress relief notch does not cut into the adhesive or adhesive tape.
27. A ballasting (e.g., wheel balancing) weight having a length, width, thickness, top, bottom, first side and second side, the ballasting weight being longer than it is wide or thick, with the bottom having a surface that curves in the thickness direction between the first side and the second side and is operatively adapted (i.e., dimensioned, designed or otherwise configured) for being bonded to a substrate surface.
28. The ballasting weight according to embodiment 27, wherein the ballasting weight is wider than it is thick.
29. The ballasting weight according to embodiment 27 or 28, wherein the substrate surface is a curved surface (e.g., a slight "tilde-" or S-shaped surface), and the curved surface of the bottom of the ballasting weight has a curvature that matches or otherwise conforms to the curved surface of the substrate surface. Bonding onto the rim flange area is more difficult, because the surface of this area is curved and not flat. As a result, slightly more weight may be needed in the rim flange area.
30. The ballasting weight according to any one of embodiments 27 to 29, wherein the ballasting weight is a wheel balancing weight, the substrate is a wheel rim comprising a an inner rim flange and/or an outer rim flange and each rim flange having a flange lip with a peripheral edge, and the substrate surface is a curved surface (e.g., a slight "tilde-" or S-shaped surface) of the rim flange, with the curved surface of the bottom of the wheel balancing weight having a curvature that matches or otherwise conforms to the curved surface of the rim flange.
31. The ballasting weight according to any one of embodiments 27 to 30, further comprising a double sided adhesive tape with one side of the adhesive tape being adhered to the bottom curved surface of the ballasting weight, wherein the adhesive tape has a leading edge spaced back from the first side of the ballasting weight.
32. The ballasting weight according to any one of embodiments 1 to 31, wherein the ballasting weight comprises one or multiple individual weights.
33. The ballasting weight according to any one of embodiments 1 to 32, wherein the ballasting weight is a wheel balancing weight.
34. The ballasting weight according to any one of embodiments 1 to 32, wherein the ballasting weight is a wheel balancing weight comprising an adhesive on the bottom for bonding the wheel balancing weight to a wheel rim, where the wheel rim comprises an inner rim flange and/or an outer rim flange and each rim flange having a flange lip with a peripheral edge, the first side of the wheel balancing weight comprises a stop surface that is operatively adapted (i.e., dimensioned, designed or otherwise configured) to be stopped by the flange lip of the rim flange, when centrifugal forces caused by the rotation of the wheel (i.e., wheel rim) are applied to the attached wheel balancing weight. The stop surface is on the leading side of the wheel balancing weight that would make contact with the peripheral edge or other portion of the flange lip, during the rotation of the wheel (i.e., wheel rim) on which the wheel balancing weight is mounted. The wheel balancing weight can either be (a) positioned so as to initially make contact with the flange lip or (b) positioned close enough to the flange lip that the resiliency of the adhesive allows the wheel balancing weight to move and make contact with the flange lip under the applied centrifugal forces caused by the rotation of the wheel (i.e., wheel rim), without the strength of the bond between the wheel balancing weight and rim flange being detrimentally affected.
35. The ballasting weight according to embodiment 34, wherein the wheel balancing weight is not thick enough to cause the wheel balancing weight to extend enough above the peripheral edge of the flange lip so as to be knocked off of the wheel rim flange. That is, the top of the wheel balancing weight is close enough to the peripheral edge of the flange lip that the flange lip protects the wheel balancing weight from being knocked off the wheel rim flange while the wheel is in use.
36. The ballasting weight according to embodiment 34 or 35, wherein the wheel balancing weight is not thick enough to extend above the peripheral edge of the flange lip, when adhered to the wheel rim flange.
37. The ballasting weight according to any one of embodiments 34 to 36, wherein the stop surface of the wheel balancing weight has a first radius of curvature in the thickness direction that is operatively adapted (i.e., dimensioned, designed or otherwise configured) to mate with, nest with, match, or otherwise conform to a second radius of curvature of the flange lip of the rim flange, when the wheel balancing weight is bent along its length in the width direction or widthwise and disposed within the second radius of curvature of the flange lip. This radius of curvature of the flange lip corresponds to the curve in the flange lip from the peripheral edge to where the wheel balancing weight is adhered to the rim flange. By conforming the side of the wheel balancing weight to the curvature of the flange lip, the flange lip is more likely to function as a stop to prevent the failure of the bond between the rim flange and the wheel balancing weight as a result of the applied centrifugal forces caused by the rotation of the wheel (i.e., wheel rim). In addition, matching the curvature of the flange lip and the corresponding side of the wheel balancing weight helps to maximize the linear density of the wheel balancing weight, which in turn, allows the corresponding wheel to be balanced with a higher degree of accuracy.
38. The ballasting weight according to any one of embodiments 34 to 37, wherein the first radius of curvature of the wheel balancing weight is the same as the second radius of curvature of the flange lip.
39. The ballasting weight according to any one of embodiments 34 to 38, wherein each wheel balancing weight has a linear density (g/cm) that is greater than that of a conventional clip-on lead wheel balancing weight (e.g., greater than 7.31 g/cm). Having a higher linear density than current clip- or bang-on lead weights can result in a smaller more aesthetically pleasing weight.
40. The ballasting weight according to any one of embodiments 34 to 39, wherein the flange lip of the rim flange has a depth that is greater than zero and less than about 47.625 mm (0.1875 inches), and the thickness of the wheel balancing weight is less than or equal to about 47.625 mm (0.1875 inches).
41. The ballasting weight according to any one of embodiments 33 to 40, wherein the adhesive is an adhesive tape (e.g., a double sided adhesive tape) and each wheel balancing weight comprises one individual weight backed by the adhesive tape.
42. The ballasting weight according to any one of embodiments 33 to 40, wherein the adhesive is an adhesive or adhesive tape (e.g., a double sided adhesive tape) and each wheel balancing weight comprises multiple individual weights backed and connected together by the adhesive or adhesive tape.
43. The ballasting weight according to embodiment 34 or 42, wherein the adhesive is adhered to the bottom of each wheel balancing weight such that none of the adhesive or adhesive tape will be located between the first side of the wheel balancing weight and a curved portion of the flange lip. It was thought that shifting the position of the adhesive tape so as to bond the first or leading side of the wheel balancing weight to the curved lip of the rim flange would result in the centrifugal forces from the rotating wheel helping to maintain the bond between the wheel balancing weight and the rim flange. Surprisingly, however, this is not what was found. During the rotation of the wheel, it appears that the angular slope of the curved rim flange lip causes a shear force to be placed on the adhesive layer, which tends to cause premature failure of the adhesive bond. It has been found that it can be more beneficial, and premature bond failure can be prevented or at least reduced, by positioning the adhesive layer only on the bottom of the wheel balancing weight and not on the curved lip of the rim flange.
44. The ballasting weight according to any one of embodiments 1 to 43, wherein the ballasting weight is a wheel balancing weight bent widthwise with a curvature having a radius matching the radius of curvature of a wheel rim flange lip.

Length of Ballasting Weight Material Embodiments

45. A length of ballasting (e.g., wheel balancing) weight material that is separable (e.g., by being mechanically or otherwise cut) into a plurality of ballasting weights according to any one of embodiments 1 to 44. For example, the length of ballasting weight material can be an length of a particle filled polymeric composite material, like the metal particle filled polymeric composite material disclosed in the published PCT application WO 2007/092018 or WO 2005/049714 that can be cut into a plurality of individual weights of any desired length. Such a length of composite material can be backed with an adhesive tape, which is cut along with the corresponding length of the composite material. Alternatively, the length of ballasting weight material can be a plurality of preformed individual weights (e.g., made of a metal) that are held together by some form of an adhesive tape. A length of this later material can comprise one or more of the individual weights desired by cutting the tape at a location between two adjacent weights.

46. The length of ballasting material according to embodiment 45, wound in a consistent and stable manner in a large level wound spool for dispensing at a customer location. This geometry and availability of delivering in level wound rolls enables automation of this process.

47. The length of ballasting material according to embodiment 45 or 46, comprising a continuous length of ballasting material backed by an adhesive tape.

48. The length of ballasting material according to any one of embodiments 45 to 47, comprising multiple individual weights backed and connected together by an adhesive tape.

49. The length of ballasting material according to any one of embodiments 45 to 48, wherein each the ballasting weight comprises one or multiple individual weights.

Wheel Embodiments

50. A wheel comprising a tire mounted on a wheel rim and a ballasting weight according to any one of embodiments 1 to 44, the ballasting weight being a wheel balancing weight, and the wheel rim comprising a an inner rim flange and/or an outer rim flange and each rim flange having a flange lip with a peripheral edge, with the wheel balancing weight being bonded, adhered or otherwise attached or applied to the inner and/or outer rim flange of the wheel rim and adjacent to the flange lip.

51. The wheel according to embodiment 50, wherein the bottom of the wheel balancing weight is adhered to the inner and/or outer rim flange of the wheel rim, with an adhesive (e.g., a double sided adhesive tape), such that the first side of the wheel balancing weight is located a distance from the flange lip in the range of from zero (i.e., the first side of the wheel balancing weight contacts the flange lip), and in increments of 0.1 mm, up to and including about twice the thickness of the adhesive tape, and any range therebetween. If the wheel balancing weight is positioned to far from the flange lip, the wheel balancing weight may have to move too far to make contact with the flange lip, resulting in the applied centrifugal forces from the rotation of the wheel (i.e., wheel rim) causing the bond between the wheel balancing weight and rim flange to fail or otherwise be detrimentally affected.

52. The wheel according to embodiment 50 or 51, wherein the bottom of the wheel balancing weight is adhered to the inner and/or outer rim flange of the wheel rim, with an adhesive or adhesive tape, such that none of the adhesive tape is located between the first side of the wheel balancing weight and the flange lip.

53. The wheel according to embodiment 50 or 51, wherein the bottom of the wheel balancing weight is adhered to the inner and/or outer rim flange of the wheel rim, with an adhesive or adhesive tape, such that there is a gap between the first side of the wheel balancing weight and the flange lip, with the adhesive tape filling in the range of from none, and in increments of 1%, up to and including about 25% of the volume of the gap, and any range therebetween (e.g., 0 to 10%). It has been found that positioning too much of the adhesive tape into the gap between the first or leading side of the wheel balancing weight and the curved flange lip of the rim flange will likely result in the centrifugal forces from the rotating wheel causing a shear force to be placed on the adhesive layer, which tends to cause premature failure of the adhesive bond. Such premature bond failure can be prevented or at least reduced, by limiting that amount of the adhesive in this gap.

Method of Balancing a Wheel Embodiments

54. A method of balancing a wheel comprising a tire (e.g., a conventional rubber automobile tire) mounted on a wheel rim, with the wheel rim comprising a an inner rim flange and/or an outer rim flange and each rim flange having a flange lip with a peripheral edge, the method comprising:
bonding or otherwise applying at least one ballasting weight according to any one of embodiments 1 to 44, in the form of at least one wheel balancing weight, to the inner and/or outer rim flange of the wheel rim at a location, adjacent to the flange lip of the rim flange, so as to balance the wheel.

55. The method according to embodiment 54, wherein the at least one wheel balancing weight is bonded to the inner and/or outer rim flange so that the first side contacts the flange lip.

56. The method according to embodiment 54, wherein the at least one wheel balancing weight is bonded to the inner and/or outer rim flange so that a gap is formed between the first side and the flange lip.

Device Embodiments

57. A device (e.g., device (70) and (80)) comprising structure operatively adapted (i.e., dimensioned, configured and/or designed) for retaining a ballasting weight (e.g., a wheel balancing weight) according to any one of embodiments 1 to 44, such that the device can be automatically or manually positioned to a desired location adjacent to a substrate surface (e.g., a wheel rim comprising an inner and/or outer rim flange having a flange lip with a peripheral edge), and the device can manipulate the ballasting weight so as to bond, adhere or otherwise attach the ballasting weight to the substrate surface (e.g., the inner or outer rim flange of the wheel rim and adjacent to the flange lip).

58. A device (e.g., device (70) and (80)) comprising structure operatively adapted (i.e., dimensioned, configured and/or designed) for retaining a ballasting weight in the form of a wheel balancing weight according to any one of embodiments 1 to 19, such that the device can be automatically or manually positioned to a desired location adjacent to a wheel rim comprising an inner and/or outer rim flange having a flange lip with a peripheral edge, and the device can manipulate the wheel balancing weight so as to bond, adhere or otherwise attach the wheel balancing weight to the inner or outer rim flange of the wheel rim and adjacent to the flange lip.

59. The device according to embodiment 57 or 58, further comprising a first arcuate jaw and a second arcuate jaw operatively adapted (i.e., dimensioned, configured and/or designed) for so retaining the ballasting weight therebetween.
60. The device according to embodiment 59, further comprising a mechanism (not shown) for biasing the first jaw and the second jaw toward each other to retain the ballasting weight therebetween and for biasing the first jaw and the second jaw away from each other to release the ballasting weight, after the ballasting weight has been bonded, adhered or otherwise attached to a surface.
61. The device according to embodiment 59 or 60, wherein the first arcuate jaw is operatively adapted (i.e., dimensioned, configured and/or designed) for receiving therein at least a portion of the second side and the top of the ballasting weight, and the second arcuate jaw is operatively adapted (i.e., dimensioned, configured and/or designed) for receiving therein at least a portion of the first side of the ballasting weight.
62. The device according to embodiment 58, further comprising a first arcuate jaw and a second arcuate jaw operatively adapted (i.e., dimensioned, configured and/or designed) for so retaining the wheel balancing weight therebetween, and a mechanism (not shown) for biasing the first jaw and the second jaw toward each other so as to retain the wheel balancing weight therebetween and for biasing the first jaw and the second jaw away from each other to release the wheel balancing weight, with the first arcuate jaw being operatively adapted (i.e., dimensioned, configured and/or designed) for receiving therein at least a portion of the second side, the top and at least a portion of at least one groove of the wheel balancing weight, and the second arcuate jaw being operatively adapted (i.e., dimensioned, configured and/or designed) for receiving therein at least a portion of the first side of the wheel balancing weight.
63. The device according to embodiment 62, wherein at least one groove of the wheel balancing weight comprises opposing surfaces, with one of the opposing surfaces being a bottom surface (e.g., a generally horizontal surface, as exemplified in FIG. 11), the other of the opposing surfaces being a side surface (e.g., a generally vertical surface, as exemplified in FIG. 11), and the opposing surfaces forming a right angle therebetween, with the first arcuate jaw being operatively adapted (i.e., dimensioned, configured and/or designed) for receiving therein at least the side surface or both the side and bottom surfaces of one groove of the wheel balancing weight. As used herein, the term right angle refers to an angle that is either exactly 90 degrees, slightly smaller than 90 degrees, or slightly larger than 90 degrees (e.g., any angle in the range of 90 degrees plus or minus up to 15 degrees).

As shown in FIGS. 6-12, an exemplary device (70) according to the present invention can hold a ballasting weight (e.g., a wheel balancing weight) in place using only the resiliency (i.e., residual stress) of the ballasting weight material acting against the curvature of the arcuate jaws, when the ballasting weight is bent along its length before or while being disposed between the jaws, and the jaws are biased together so as to retain the ballasting weight therebetween. While not necessarily required, it may be desirable to use a vacuum or magnets to provide additional force for retaining the ballasting weight between the jaws. The jaws of such a device can be mated or otherwise brought together in this orientation at the output of a system for dispensing and then cutting a desired length or mass of the ballasting weight. In one process for using such a ballasting weight (e.g., a wheel balancing weight), a weight dispensing mechanism (not shown) can be actuated to push a desired amount or length of a ballasting weight material into the device, between its two jaws. The jaws can be biased together before or after the desired ballasting weight material is in position in the device. A cutting mechanism, being separate from or forming part of the dispensing mechanism, can then be used to cut the desired ballasting weight off from the ballasting weight material remaining outside of the device. If the ballasting weight is backed with an adhesive, a release liner protecting the adhesive surface can be removed by a portion of the dispensing mechanism prior to or after the desired amount of ballasting weight material is disposed within the device and cut to form the desired ballasting weight.

Figures 5A, 5B, 5C:
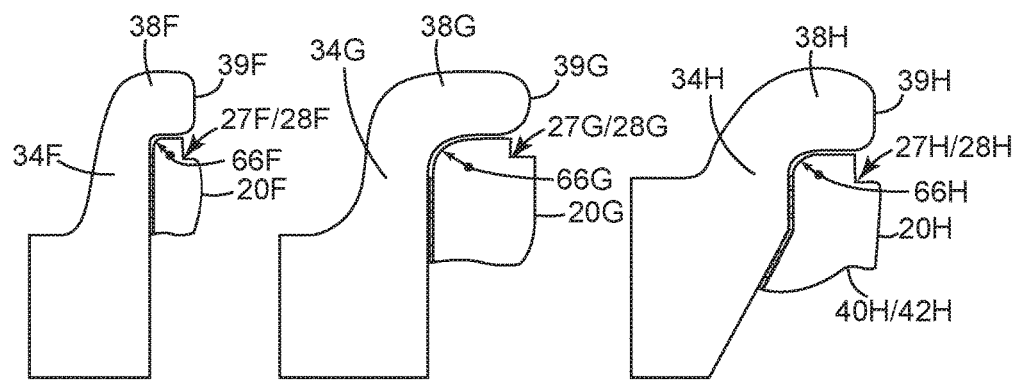
FIGS. 5A through 5G are cross sectional views of various rim flanges mounting a wheel balancing weight, with each wheel balancing weight having a different end profile, according to the present invention.
Figures 5D, 5E:
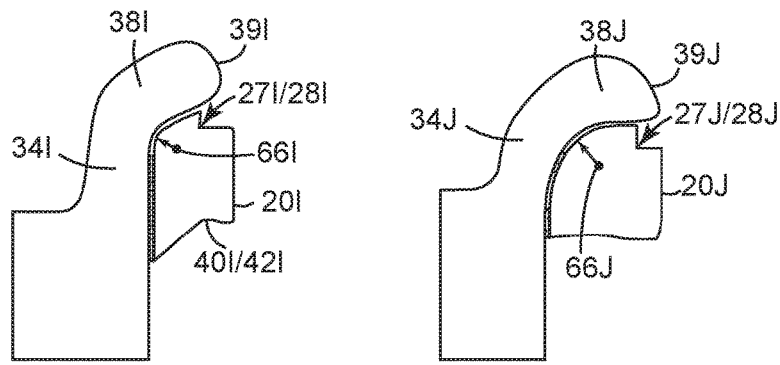
Figures 5F, 5G:
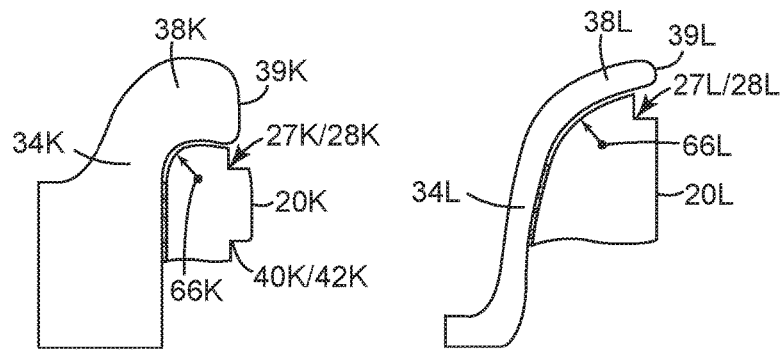
Figure 6:
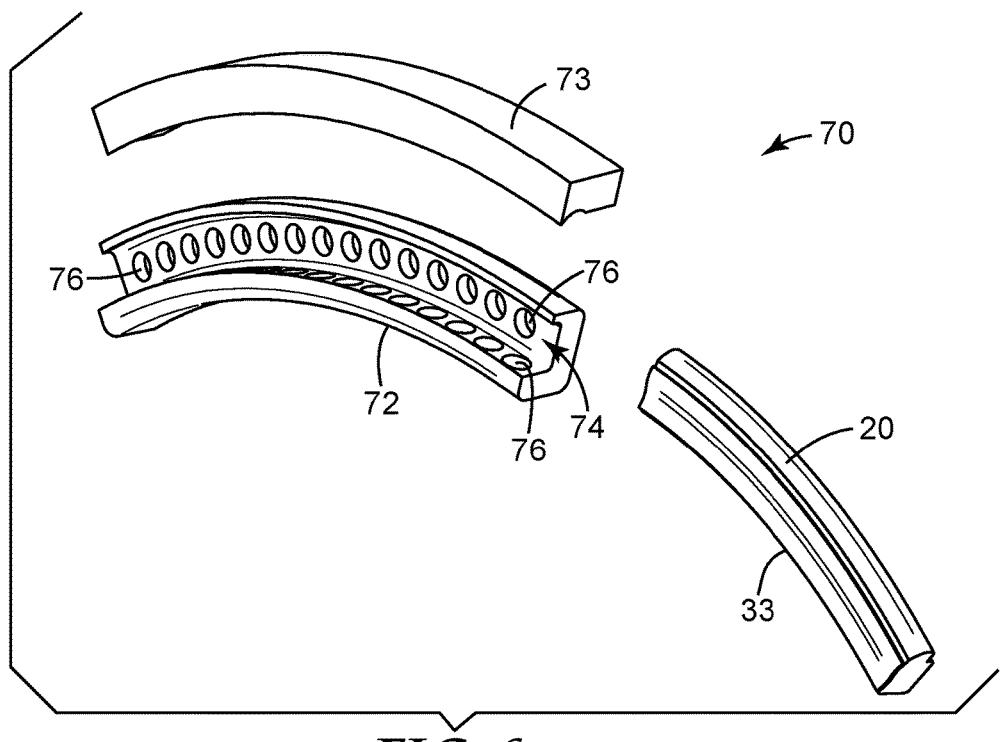
FIG. 6 is a perspective bottom view of a length of ballasting weight (e.g., a wheel balancing weight) and one embodiment of a device for retaining, disposing and/or attaching such a ballasting weight to a desired location on the surface of a substrate.
Figure 7:
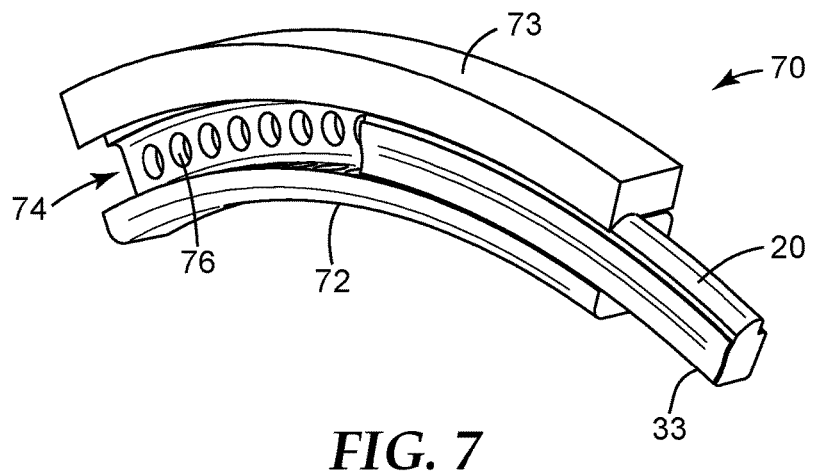
FIG. 7 is a perspective bottom view of the ballasting weight material and device of FIG. 6, with the ballasting weight partially retained between the jaws of the device.
Figure 8:
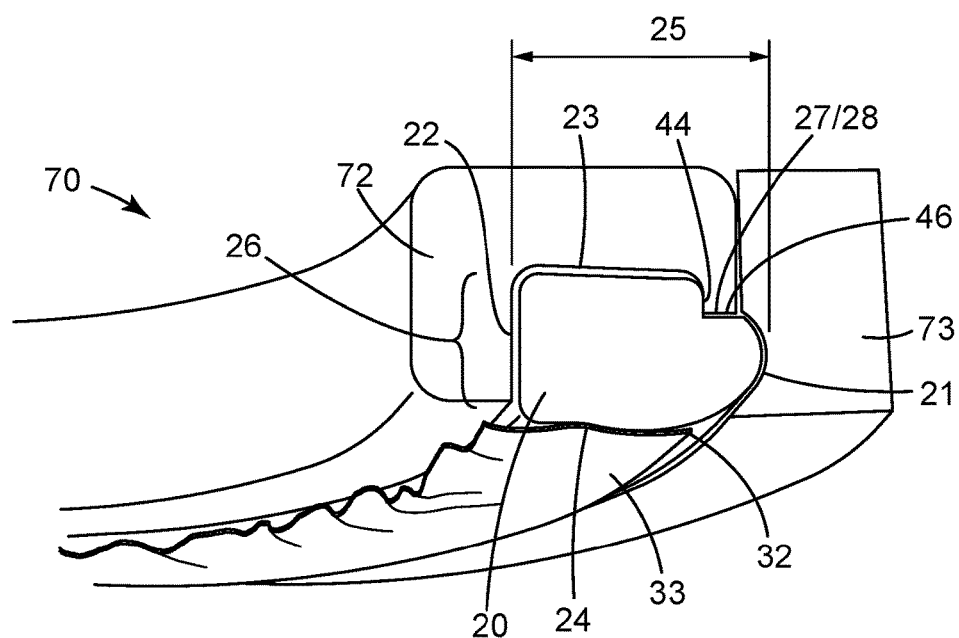
FIG. 8 is a perspective end view of the device of FIG. 6, with the ballasting weight fully retained between the jaws of the device and with a release liner having a width extending beyond the adhesive it protects to facilitate its removal.
Figure 9:
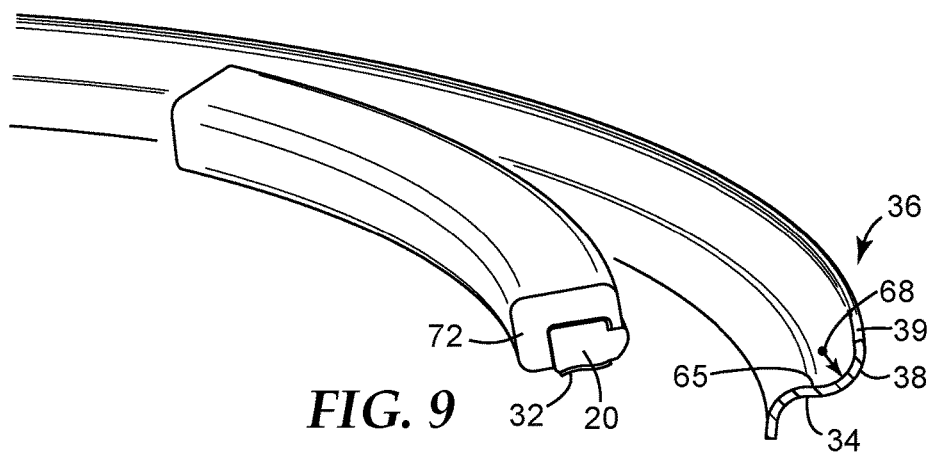
FIG. 9 is a perspective view of one jaw of the device of FIG. 6, with the ballasting weight fully retained therein and in position to apply the ballasting weight onto the rim flange of a vehicle wheel rim.

As shown in FIGS. 5A-5A, it can be desirable for a notch according to the present invention to be located at least in the upper corner of the cross-sectional profile (i.e., for a groove to be located at least in the upper corner of the ballasting weight), where the top and the first side come together. With the groove in this location, the device can retain the wheel balancing weight by applying a gripping force against the side or retaining surface of the groove and at least a corresponding surface of the second side of a wheel balancing weight. In addition, the portion of the device that contacts the groove has the same or smaller width or depth as that of the bottom surface of the groove, which enables that portion of the device to be disposed between the flange lip and the side or retaining surface of the wheel balancing weight groove. As a result, that portion of the device can be disposed below the peripheral edge of the flange lip, and thereby, the first side of the wheel balancing weight can be accurately positioned against so as to contact the flange lip of the rim flange and pressure applied so that the adhesive on the bottom of the wheel balancing weight becomes activated and/or sufficiently wets out enough to adequately bond to the wheel rim flange.

Figure 10:
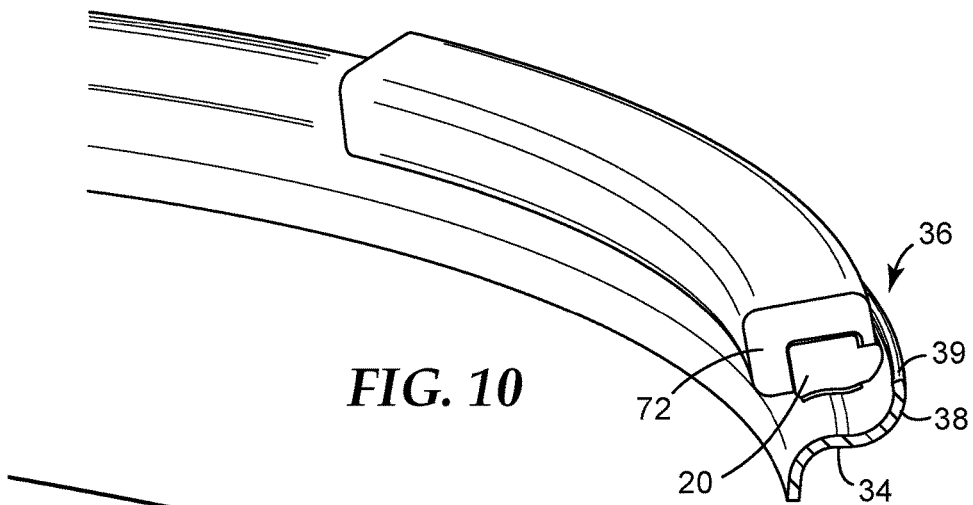
FIG. 10 is a perspective view of the device jaw and ballasting weight of FIG. 9 in position to apply the ballasting weight adjacent the flange lip of the rim flange.

Referring to FIG. 10, there can be an optimum orientation of the device for applying a loaded adhesive-backed wheel balancing weight to the rim flange of a wheel rim (e.g., 8 degrees from vertical) in order to clear any slight acute bend at the peripheral edge of the flange lip. It can also desirable for this orientation angle to be perpendicular to the average surface of the adhesive on the bottom of the wheel balancing weight. After the weight is adhered to the surface, the jaws of the device can be opened and moved away. If only the resiliency of the weight is used to retain the weight between the closed jaws, then the jaws may be able to remain closed when the device is removed, as the strength of the adhesive bond overcomes the resiliency force that was holding the weight in the device.

Method of Balancing a Wheel Embodiments

64. A method of balancing a wheel comprising a tire mounted on a wheel rim, with the wheel rim comprising an inner rim flange and/or an outer rim flange and each rim flange having a flange lip with a peripheral edge, the method comprising:
providing a device (e.g., device (70) and (80)) comprising structure operatively adapted (i.e., dimensioned, configured and/or designed) for releasably retaining a ballasting weight according to any one of embodiments 1 to 44, where the ballasting weight is in the form of a wheel balancing weight, which can comprise one or multiple individual weights;
disposing the wheel balancing weight so as to be releasably retained by the device;

automatically or manually positioning the device to a desired location, adjacent to the rim flange of the wheel rim, that balances the wheel; and bonding, adhering or otherwise attaching the wheel balancing weight to the inner and/or outer rim flange of the wheel rim at the desired location, adjacent to the flange lip of the rim flange.

This invention may take on various modifications and alterations without departing from its spirit and scope. Accordingly, this invention is not limited to the above-described but is to be controlled by the limitations set forth in the following embodiments and any equivalents thereof.

This invention may be suitably practiced in the absence of any element not specifically disclosed herein.

All patents and patent applications cited above, including those in the Background section, are incorporated by reference into this document in total.

What is claimed is:

1. A ballasting weight having a length, width, thickness, first side, second side, top, and bottom, and a cross-sectional profile comprising a notch forming a groove extending uninterrupted longitudinally along the entire length of the first side of said ballasting weight and a curved surface of the first side between the notch and the bottom, with said ballasting weight being backed by an adhesive, wherein said groove facilitates the automatic dispensing and applying of said ballasting weight, and said adhesive is suitable for bonding said ballasting weight to a surface.

2. The ballasting weight according to claim 1, wherein each groove comprises opposing surfaces, with one of the opposing surfaces being a bottom surface, the other of the opposing surfaces being a side surface, and the opposing surfaces forming an angle therebetween in the range of from about 45 degrees up to and including about 135 degrees.

3. The ballasting weight according to claim 2, wherein either (a) the side surface of at least one groove is a retaining surface against which a device can apply a gripping force to retain said ballasting weight within the device, (b) the bottom surface of the at least one groove is a pressurizing surface against which a device can transmit a force to press said ballasting weight against a surface, or (c) both (a) and (b).

4. The ballasting weight according to claim 2, further comprising a flat surface on at least one of said top, second side, groove bottom surface, and groove side surface.

5. The ballasting weight according to claim 1, wherein said ballasting weight is longer than it is wide and wider than it is thick, with either (a) a width to thickness ratio (W/T) in the range from at least about 1.0, and in increments of 0.1, up to less than about 2.3, such that said ballasting weight can be readily bent widthwise, (b) said bottom having a surface that curves between said first side and said second side and is operatively adapted for being bonded to a substrate surface, or (c) both (a) and (b).

6. The ballasting weight according to claim 1, wherein the ballasting weight comprises one or multiple individual weights, and said ballasting weight is a wheel balancing weight.

7. The ballasting weight according to claim 1, wherein each ballasting weight comprises one individual weight backed by said adhesive.

8. A length of ballasting weight material that is separable into a plurality of weights according to claim 1.

9. The length of ballasting material according to claim 8, wherein said adhesive is an adhesive tape, and further comprising either a continuous length of ballasting material backed by said adhesive tape or multiple individual weights backed and connected together by said adhesive tape.

10. A wheel comprising a tire mounted on a wheel rim and a ballasting weight according to claim 1, said ballasting weight being a wheel balancing weight, and said wheel rim comprising a rim flange having a flange lip with a peripheral edge, with said wheel balancing weight being attached to the rim flange of the wheel rim and adjacent to said flange lip.

11. The wheel according to claim 10, wherein the bottom of said wheel balancing weight is adhered to the rim flange of the wheel rim, with said adhesive, such that (a) the first side of said wheel balancing weight is located a distance from said flange lip in the range of from zero up to and including about twice the thickness of said adhesive, or (b) there is a gap between the first side of said wheel balancing weight and said flange lip, with said adhesive filling in the range of from none up to and including about 25% of the volume of said gap, or (c) none of said adhesive is located between the first side of said wheel balancing weight and said flange lip, or (a) and (c), or (b) and (c).

12. A device comprising structure operatively adapted for retaining a ballasting weight according to claim 1, such that said device can be positioned to a desired location adjacent to a substrate surface, and said device can manipulate the ballasting weight so as to attach the ballasting weight to the substrate surface.

13. The device of claim 12, wherein the ballasting weight is in the form of a wheel balancing weight, said device can be positioned to a desired location adjacent to a wheel rim comprising a rim flange having a flange lip with a peripheral edge, and said device can manipulate the wheel balancing weight so as to attach the wheel balancing weight to the rim flange of the wheel rim and adjacent to the flange lip.

14. The device according to claim 13, further comprising a first arcuate jaw and a second arcuate jaw operatively adapted for so retaining the wheel balancing weight therebetween, and a mechanism for biasing said first jaw and said second jaw toward each other so as to retain the wheel balancing weight therebetween and for biasing said first jaw and said second jaw away from each other to release the wheel balancing weight, with said first arcuate jaw being operatively adapted for receiving therein at least a portion of the second side, the top and at least a portion of at least one groove of the wheel balancing weight, and said second arcuate jaw being operatively adapted for receiving therein at least a portion of the first side of the wheel balancing weight.

15. The device according to claim 12, further comprising a first arcuate jaw and a second arcuate jaw operatively adapted for so retaining the ballasting weight therebetween.

16. The device according to claim 15, wherein said first arcuate jaw is operatively adapted for receiving therein at least a portion of the second side and the top of the ballasting weight, and said second arcuate jaw is operatively adapted for receiving therein at least a portion of the first side of the ballasting weight.

17. The device according to claim 12, wherein said ballasting weight is bent along its length either (a) widthwise with a curvature having a radius, or (b) in its thickness direction, while said weight is in said device.

18. A method of balancing a wheel comprising a tire mounted on a wheel rim, with the wheel rim comprising a rim flange having a flange lip with a peripheral edge, said method comprising:

bonding at least one ballasting weight according to claim 1, in the form of at least one wheel balancing weight, to the rim flange of the wheel rim at a location, adjacent to the flange lip of said rim flange, so as to balance the wheel.

19. The method according to claim 18, wherein said at least one wheel balancing weight is bonded to the rim flange so that the first side either contacts the flange lip or so that a gap is formed between the first side and the flange lip.

20. The method of claim 18, said method further comprising:
   providing a device comprising structure operatively adapted for releasably retaining the ballasting weight, where the ballasting weight is in the form of a wheel balancing weight;
   disposing the wheel balancing weight so as to be releasably retained by the device; and
   positioning the device to a desired location, adjacent to the rim flange of the wheel rim, that balances the wheel.

* * * * *

UNITED STATES PATENT AND TRADEMARK OFFICE
CERTIFICATE OF CORRECTION

PATENT NO. : 10,428,900 B2
APPLICATION NO. : 15/122188
DATED : October 1, 2019
INVENTOR(S) : Benjamin Belknap et al.

It is certified that error appears in the above-identified patent and that said Letters Patent is hereby corrected as shown below:

In the Specification

Column 3
Line 54, after "less)" insert -- 69a --.

Signed and Sealed this
Third Day of December, 2019

Andrei Iancu
*Director of the United States Patent and Trademark Office*